(12) United States Patent
Yao

(10) Patent No.: US 12,354,471 B2
(45) Date of Patent: Jul. 8, 2025

(54) METHOD AND APPARATUS FOR PUSHING VEHICLE INFORMATION, USER ACCOUNT SERVER, AND USER EQUIPMENT

(71) Applicant: Huawei Technologies Co., Ltd., Guangdong (CN)

(72) Inventor: Xuan Yao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 17/758,169

(22) PCT Filed: Nov. 11, 2020

(86) PCT No.: PCT/CN2020/128066
§ 371 (c)(1),
(2) Date: Jun. 29, 2022

(87) PCT Pub. No.: WO2021/135659
PCT Pub. Date: Jul. 8, 2021

(65) Prior Publication Data
US 2023/0024222 A1    Jan. 26, 2023

(30) Foreign Application Priority Data
Dec. 31, 2019    (CN) .......................... 201911423594.6

(51) Int. Cl.
*H04L 67/12*    (2022.01)
*G06V 20/54*    (2022.01)
(Continued)

(52) U.S. Cl.
CPC ........... *G08G 1/0116* (2013.01); *G06V 20/54* (2022.01); *G06V 20/625* (2022.01); *G07B 15/02* (2013.01);
(Continued)

(58) Field of Classification Search
CPC ....... H04W 4/12; H04W 4/021; H04W 4/025; H04W 4/44; G07B 15/02; G08G 1/017;
(Continued)

(56) References Cited

U.S. PATENT DOCUMENTS 10,964,215 B1 *    3/2021   Papineau ................ G06V 40/10
11,113,841 B1 *    9/2021   Zelenskiy ................ G06T 7/74
(Continued)

FOREIGN PATENT DOCUMENTS

CN           103561052 A      2/2014
CN           104616361 A      5/2015
(Continued)

*Primary Examiner* — Kenneth T Lam
(74) *Attorney, Agent, or Firm* — WOMBLE BOND DICKINSON (US) LLP

(57) ABSTRACT

A method and an apparatus for pushing vehicle information, a user account server, and user equipment are provided. The method includes: receiving an entry event that is of a vehicle and that is sent by a parking management server, and obtaining geo-fence information of a parking lot managed by the parking management server; obtaining, by a user account server, a user account bound to the license plate number of the vehicle; obtaining a location determining result of user equipment corresponding to the user account; and pushing the entry event of the vehicle to the user equipment when the current location of the user equipment is within a geo-fence range.

12 Claims, 13 Drawing Sheets

(51) Int. Cl.
*G06V 20/62* (2022.01)
*G07B 15/02* (2011.01)
*G08G 1/01* (2006.01)
*G08G 1/017* (2006.01)
*G08G 1/14* (2006.01)
*H04W 4/02* (2018.01)
*H04W 4/021* (2018.01)
*H04W 4/12* (2009.01)
*H04L 67/306* (2022.01)

(52) U.S. Cl.
CPC ............. *G08G 1/017* (2013.01); *G08G 1/148* (2013.01); *H04W 4/021* (2013.01); *H04W 4/025* (2013.01); *H04W 4/12* (2013.01); *G06V 2201/08* (2022.01); *H04L 67/12* (2013.01); *H04L 67/306* (2013.01)

(58) Field of Classification Search
CPC .... G08G 1/148; G08G 1/0141; G08G 1/0175; G08G 1/0116; G08G 1/127; G06V 2201/08; G06Q 50/40; H04L 67/12; H04L 67/306; H04L 67/52; H04L 67/55; G06F 16/29; G06F 16/9535; G06F 16/9537
See application file for complete search history.

(56) References Cited

U.S. PATENT DOCUMENTS

| | | | |
|---|---|---|---|
| 11,862,020 B2* | 1/2024 | Khurana | G08G 1/0175 |
| 2015/0213716 A1* | 7/2015 | Aggarwal | G08G 1/146 |
| | | | 340/932.2 |
| 2016/0140846 A1* | 5/2016 | Outwater | G08G 1/144 |
| | | | 340/932.2 |
| 2018/0285657 A1* | 10/2018 | Koreishi | G08G 1/04 |
| 2019/0057372 A1* | 2/2019 | Batten | G06Q 30/0261 |
| 2019/0340841 A1* | 11/2019 | Coyne | G07F 17/24 |
| 2020/0065784 A1* | 2/2020 | Philipson | G06Q 20/227 |
| 2020/0175868 A1* | 6/2020 | Reisbick | G08G 1/142 |
| 2020/0211071 A1* | 7/2020 | Rosas-Maxemin | |
| | | | G06Q 30/0284 |
| 2020/0380864 A1* | 12/2020 | Yan | G06V 20/40 |
| 2022/0036662 A1* | 2/2022 | Nakade | G07B 15/04 |

FOREIGN PATENT DOCUMENTS

| | | |
|---|---|---|
| CN | 106469468 A | 3/2017 |
| CN | 107481334 A | 12/2017 |
| CN | 108513257 A | 9/2018 |
| CN | 109218966 A | 1/2019 |
| CN | 109255847 A | 1/2019 |
| CN | 109615716 A | 4/2019 |
| CN | 110602641 A | 12/2019 |
| JP | 5988184 B1 | 9/2016 |
| WO | 2017128079 A1 | 8/2017 |

* cited by examiner

METHOD AND APPARATUS FOR PUSHING VEHICLE INFORMATION, USER ACCOUNT SERVER, AND USER EQUIPMENT

This application is a National Stage of International Application No. PCT/CN2020/128066 filed on Nov. 11, 2020, which claims priority to Chinese Patent Application No. 201911423594.6, filed on Dec. 31, 2019, both of which are hereby incorporated by reference in their entireties.

TECHNICAL FIELD

This application relates to the field of artificial intelligence technologies, and in particular, to a method and an apparatus for pushing vehicle information, a user account server, and user equipment.

BACKGROUND

In the conventional technology, many parking lots are equipped with frictionless parking systems. A usage scenario is as follows: After a license plate number is obtained by using a camera at an entrance/exit, vehicle entry/exit information is pushed to a user account bound to the license plate number according to a binding relationship between the license plate number and the user account, and a fee deduction operation is performed.

However, in an existing solution, there is a risk that vehicle location information of a user is leaked. When the user account is bound to the license plate number, a vehicle owner is not verified. Therefore, it cannot be ensured that this user account is owned by the vehicle owner or a user authorized by the vehicle owner. However, the parking system performs pushing only based on binding information. Consequently, the vehicle location information is directly leaked, to cause personal data leakage risks. Currently, an existing mitigation measure is as follows: When a user account is bound to a license plate number, certificate information such as vehicle license and/or ID card information needs to be uploaded for identity authentication. However, this measure violates a principle of minimizing personal data collection, and the uploading of the vehicle license and/or ID card information may cause greater data leakage risks.

SUMMARY

This application provides a method and an apparatus for pushing vehicle information, a user account server, and user equipment. This application further provides a computer-readable storage medium, to protect vehicle location information of a user and avoid leakage of the vehicle location information.

According to a first aspect, this application provides a method for pushing vehicle information. The method includes the following operations:

receiving a vehicle entry event sent by a parking management server, and obtaining geo-fence information of a parking lot managed by the parking management server, where the vehicle entry event is sent by the parking management server after the parking management server receives a notification message indicating that a vehicle enters the parking lot, and the vehicle entry event includes a license plate number of the vehicle;

obtaining a user account bound to the license plate number of the vehicle;

obtaining a location determination result of user equipment corresponding to the user account, where the location determination result includes a determination result about whether a current location of the user equipment is within a geo-fence range indicated by the geo-fence information; and pushing the vehicle entry event to the user equipment when the current location of the user equipment is within the geo-fence range.

It should be noted that the parking management server is a server of a management system of the parking lot, and the parking management server is connected to the user account server.

The user account server is connected to the user equipment. The user equipment may be an electronic device used by a user, such as a smartphone, a tablet computer, a notebook computer, a wearable intelligent device, an uncrewed aerial vehicle, an intelligent connected vehicle (ICV), a smart/an intelligent car, or an in-vehicle device.

After detecting that the vehicle enters the parking lot, a camera at an entrance/exit gate of the parking lot sends, to the parking management server of the parking lot, the notification message indicating that the vehicle enters the parking lot. The notification message includes the license plate number of the vehicle. In addition, the notification message may further include a moment at which the vehicle enters the parking lot. After receiving the notification message, the parking management server sends the vehicle entry event to the user account server, and the user account server receives the vehicle entry event sent by the parking management server. The vehicle entry event includes the license plate number of the vehicle.

The obtaining geo-fence information of a parking lot managed by the parking management server may be: The user account server receives the geo-fence information that is of the parking lot and that is sent by the parking management server, that is, the parking management server may send the geo-fence information of the parking lot to the user account server when sending the vehicle entry event to the user account server. In this way, the user account server receives the vehicle entry event sent by the parking management server, and receives the geo-fence information that is of the parking lot and that is sent by the parking management server.

Alternatively, the obtaining geo-fence information of a parking lot managed by the parking management server may be as follows:

The user account server obtains the prestored geo-fence information of the parking lot, that is, the parking management server may send the geo-fence information of the parking lot to the user account server in advance, and the user account server stores the geo-fence information of the parking lot. After receiving the vehicle entry event sent by the parking management server, the user account server obtains the prestored geo-fence information of the parking lot.

In the foregoing method for pushing the vehicle information, after the vehicle entry event sent by the parking management server is received, and the geo-fence information of the parking lot managed by the parking management server is obtained, the user account server obtains the user account bound to the license plate number of the vehicle, and obtains the location determination result of the user equipment corresponding to the user account. Then, the vehicle entry event is pushed to the user equipment when the current location of the user equipment is within the geo-fence range. In this way, even if a user account corresponding to user equipment whose current location is different from a location of the vehicle is bound to the license plate number of the vehicle, the user equipment does not receive pushed information indicating that the vehicle enters the parking lot, so that vehicle location information of the user can be effectively protected, and vehicle location information push is more intelligent.

In an embodiment, the obtaining a location determination result of user equipment corresponding to the user account includes:
  sending the geo-fence information of the parking lot to the user equipment corresponding to the user account, and notifying the user equipment to report the location determination result of the user equipment; and
  receiving the location determination result that is of the user equipment and that is sent by the user equipment, where the location determination result is sent by the user equipment after the user equipment positions the current location of the user equipment and determines whether the current location of the user equipment is within the geo-fence range indicated by the geo-fence information.

That is, in this implementation, the user account server sends the geo-fence information of the parking lot to the user equipment, and notifies the user equipment to report the location determination result. After the user equipment positions the current location of the user equipment and determines whether the current location of the user equipment is within the geo-fence range indicated by the geo-fence information, the user account server receives the location determination result that is of the user equipment and that is sent by the user equipment, to push, based on the location determination result of the user equipment, the vehicle entry event to the user equipment only when the current location of the user equipment is within the geo-fence range. This effectively protects the vehicle location information of the user.

In an embodiment, the obtaining a location determination result of user equipment corresponding to the user account includes:
  notifying the user equipment corresponding to the user account to report the current location of the user equipment;
  receiving the current location that is of the user equipment and that is sent by the user equipment; and
  determining whether the current location of the user equipment is within the geo-fence range indicated by the geo-fence information.

In other words, in this implementation, the user account server may notify the user equipment corresponding to the user account to report the current location of the user equipment, and then receive the current location that is of the user equipment and that is sent by the user equipment. Next, the user account server determines whether the current location of the user equipment is within the geo-fence range indicated by the geo-fence information, to obtain the location determination result of the user equipment. The geo-fence information is a closed range enclosed by a group of location coordinates (such as, longitude and latitude coordinates). If the user account server determines that coordinates of the current location of the user equipment are within the closed range, it may be determined that the user equipment is within the geo-fence range. Alternatively, if the user account server determines that coordinates of the current location of the user equipment are not within the closed range, it may be determined that the user equipment is not within the geo-fence range. After obtaining the location determination result of the user equipment, the user account server may push, based on the location determination result of the user equipment, the vehicle entry event to the user equipment only when the current location of the user equipment is within the geo-fence range. This effectively protects the vehicle location information of the user.

In an embodiment, after the pushing the vehicle entry event to the user equipment when the current location of the user equipment is within the geo-fence range, the method further includes:
  receiving a vehicle exit event sent by the parking management server, where the vehicle exit event is sent by the parking management server after the parking management server receives a notification message indicating that the vehicle moves out of the parking lot, and the vehicle exit event includes the license plate number of the vehicle;
  obtaining user accounts bound to the license plate number;
  searching the user accounts bound to the license plate number for a target user account to which the license plate number has been pushed in a latest vehicle entry event, where the target user account includes a user account to which the license plate number has been pushed in the latest vehicle entry event; and
  if the target user account is found, pushing the vehicle exit event and fee deduction information of the vehicle to user equipment corresponding to the target user account.

In this embodiment, after detecting that the vehicle moves out of the parking lot, the camera at the entrance/exit gate of the parking lot sends, to the parking management server of the parking lot, the notification message indicating that the vehicle moves out of the parking lot. The notification message includes the license plate number of the vehicle. In addition, the notification message may further include a moment at which the vehicle moves out of the parking lot. After receiving the notification message, the parking management server sends the vehicle exit event to the user account server, and the user account server receives the vehicle exit event sent by the parking management server. The vehicle exit event includes the license plate number of the vehicle. The latest vehicle entry event is a vehicle entry event corresponding to the current vehicle exit event.

In an embodiment, after the searching the user accounts bound to the license plate number for a target user account to which the license plate number has been pushed in a latest vehicle entry event, the method further includes:
  if the target user account is not found, searching the user accounts bound to the license plate number for a user account supporting fee deduction; and
  sending fee deduction information of the vehicle to the user account supporting fee deduction.

In other words, in this implementation, the user account server pushes the vehicle exit event and the fee deduction information of the vehicle only to the user equipment corresponding to the target user account. The target user account is the user account to which the user account server has pushed the latest vehicle entry event. According to the method provided in this embodiment of this application, the user account server pushes the vehicle entry event to the user equipment when the current location of the user equipment is within the geo-fence range. In this way, even if a user account corresponding to the user equipment whose current location is different from a location of the vehicle is bound to the license plate number of the vehicle, the user equipment does not receive pushed information indicating that the vehicle moves out of the parking lot. In addition, if the user account server does not find the target user account, the user account server sends only the fee deduction information of the vehicle to the user account supporting fee deduction, and does not push the vehicle exit event. This can effectively protect the vehicle location information of the user, and avoid leakage of the vehicle location information of the user.

According to a second aspect, this application provides a method for pushing vehicle information. The method includes the following operations:

receiving geo-fence information that is of a parking lot and that is sent by a user account server and reporting a notification about a location determination result of user equipment, where a user account corresponding to the user equipment includes a user account bound to a license plate number of a vehicle, and the geo-fence information of the parking lot is sent by the user account server after the user account server receives a vehicle entry event indicating that the vehicle enters the parking lot;

positioning a current location of the user equipment;

determining whether the current location of the user equipment is within a geo-fence range indicated by the geo-fence information, where the geo-fence information is a closed range enclosed by a group of location coordinates (such as, longitude and latitude coordinates); if the user account server determines that coordinates of the current location of the user equipment are within the closed range, it may be determined that the user equipment is within the geo-fence range; or, if the user account server determines that coordinates of the current location of the user equipment are not within the closed range, it may be determined that the user equipment is not within the geo-fence range;

sending the location determination result of the user equipment to the user account server; and receiving the vehicle entry event that is of the vehicle and that is sent by the user account server, where the vehicle entry event is sent by the user account server after the user account server determines that the current location of the user equipment is within the geo-fence range.

In an embodiment, after the receiving the vehicle entry event that is of the vehicle and that is pushed by the user account server, the method further includes:

receiving a vehicle exit event of the vehicle and fee deduction information that are sent by the user account server, where the vehicle exit event and the fee deduction information are sent by the user account server after the user account server determines that the user account server has pushed a latest vehicle entry event of the vehicle to the user equipment.

In the method for pushing the vehicle information, after receiving the geo-fence information that is of the parking lot and that is sent by the user account server and reporting the notification about the location determination result of the user equipment, the user equipment determines whether the current location of the user equipment is within the geo-fence range indicated by the geo-fence information, sends the location determination result to the user account server, and then receives the vehicle entry event that is of the vehicle and that is sent by the user account server. The vehicle entry event is sent after the user account server determines that the current location of the user equipment is within the geo-fence range. In this way, even if a user account corresponding to user equipment whose current location is different from a location of the vehicle is bound to the license plate number of the vehicle, the user equipment does not receive pushed information indicating that the vehicle enters the parking lot, so that vehicle location information of a user can be effectively protected.

According to a third aspect, this application provides an apparatus for pushing vehicle information. The apparatus includes:

a receiving module, configured to receive a vehicle entry event sent by a parking management server, where the vehicle entry event is sent by the parking management server after the parking management server receives a notification message indicating that a vehicle enters a parking lot, and the vehicle entry event includes a license plate number of the vehicle;

an obtaining module, configured to: obtain geo-fence information of the parking lot managed by the parking management server; obtain a user account bound to the license plate number of the vehicle; and obtain a location determination result of user equipment corresponding to the user account, where the location determination result includes a determination result about whether a current location of the user equipment is within a geo-fence range indicated by the geo-fence information; and a push module, configured to push the vehicle entry event to the user equipment when the current location of the user equipment is within the geo-fence range.

In an embodiment, the obtaining module includes:

a sending submodule, configured to: send the geo-fence information of the parking lot to the user equipment corresponding to the user account, and notify the user equipment to report the location determination result of the user equipment; and a receiving submodule, configured to receive the location determination result that is of the user equipment and that is sent by the user equipment, where the location determination result is sent by the user equipment after the user equipment positions the current location of the user equipment and determines whether the current location of the user equipment is within the geo-fence range indicated by the geo-fence information.

In an embodiment, the obtaining module includes:

a sending submodule, configured to notify the user equipment corresponding to the user account to report the current location of the user equipment;

a receiving submodule, configured to receive the current location that is of the user equipment and that is sent by the user equipment; and a determining submodule, configured to determine whether the current location of the user equipment is within the geo-fence range indicated by the geo-fence information.

In an embodiment, the apparatus further includes an event receiving module and a search module.

The event receiving module is configured to: after the push module pushes the vehicle entry event to the user equipment when the current location of the user equipment is within the geo-fence range, receive a vehicle exit event sent by the parking management server. The vehicle exit event is sent by the parking management server after the parking management server receives a notification message indicating that the vehicle moves out of the parking lot, and the vehicle exit event includes the license plate number of the vehicle.

The obtaining module is further configured to obtain user accounts bound to the license plate number.

The search module is configured to search the user accounts that are bound to the license plate number and that are obtained by the obtaining module for a target user account to which the license plate number has been pushed in a latest vehicle entry event.

The push module is configured to: when the search module finds the target user account, push the vehicle exit event and fee deduction information of the vehicle to user equipment corresponding to the target user account.

In an embodiment, the search module is further configured to: after the search module searches the user accounts bound to the license plate number for the target user account to which the license plate number has been pushed in the latest vehicle entry event, and when the target user account is not found, search the user accounts bound to the license plate number for a user account supporting fee deduction.

The push module is further configured to send fee deduction information of the vehicle to the user account supporting fee deduction.

According to a fourth aspect, this application provides an apparatus for pushing vehicle information. The apparatus includes:

a receiving module, configured to receive geo-fence information that is of a parking lot and that is sent by a user account server and report a notification about a location determination result of user equipment, where a user account corresponding to the user equipment includes a user account bound to a license plate number of a vehicle, and the geo-fence information of the parking lot is sent by the user account server after the user account server receives a vehicle entry event indicating that the vehicle enters the parking lot;

a positioning module, configured to position a current location of the user equipment;

a determining module, configured to determine whether the current location of the user equipment is within a geo-fence range indicated by the geo-fence information; and a sending module, configured to send the location determination result of the user equipment to the user account server.

The receiving module is further configured to receive the vehicle entry event that is of the vehicle and that is sent by the user account server, where the vehicle entry event is sent by the user account server after the user account server determines that the current location of the user equipment is within the geo-fence range.

In an embodiment, the receiving module is further configured to: after receiving the vehicle entry event that is of the vehicle and that is pushed by the user account server, receive a vehicle exit event of the vehicle and fee deduction information that are sent by the user account server. The vehicle exit event and the fee deduction information are sent by the user account server after the user account server determines that the user account server has pushed a latest vehicle entry event of the vehicle to the user equipment.

According to a fifth aspect, this application provides a user account server. The user account server includes:

one or more processors, a memory, a plurality of applications, and one or more computer programs, where the one or more computer programs are stored in the memory, the one or more computer programs include instructions, and when the instructions are executed by the user account server, the user account server is enabled to perform the following operations:

receiving a vehicle entry event sent by a parking management server, and obtaining geo-fence information of a parking lot managed by the parking management server, where the vehicle entry event is sent by the parking management server after the parking management server receives a notification message indicating that a vehicle enters the parking lot, and the vehicle entry event includes a license plate number of the vehicle;

obtaining a user account bound to the license plate number of the vehicle;

obtaining a location determination result of user equipment corresponding to the user account, where the location determination result includes a determination result about whether a current location of the user equipment is within a geo-fence range indicated by the geo-fence information; and pushing the vehicle entry event to the user equipment when the current location of the user equipment is within the geo-fence range.

In an embodiment, when the instructions are executed by the user account server, the user account server is enabled to perform the following operations:

sending the geo-fence information of the parking lot to the user equipment corresponding to the user account, and notifying the user equipment to report the location determination result of the user equipment; and receiving the location determination result that is of the user equipment and that is sent by the user equipment, where the location determination result is sent by the user equipment after the user equipment positions the current location of the user equipment and determines whether the current location of the user equipment is within the geo-fence range indicated by the geo-fence information.

In an embodiment, when the instructions are executed by the user account server, the user account server is enabled to perform the following operations:

notifying the user equipment corresponding to the user account to report the current location of the user equipment;

receiving the current location that is of the user equipment and that is sent by the user equipment; and determining whether the current location of the user equipment is within the geo-fence range indicated by the geo-fence information.

In an embodiment, when the instructions are executed by the user account server, the user account server is enabled to perform the following operations:

after the vehicle entry event is pushed to the user equipment when the current location of the user equipment is within the geo-fence range, receiving a vehicle exit event sent by the parking management server, where the vehicle exit event is sent by the parking management server after the parking management server receives a notification message indicating that the vehicle moves out of the parking lot, and the vehicle exit event includes the license plate number of the vehicle;

obtaining user accounts bound to the license plate number;

searching the user accounts bound to the license plate number for a target user account to which the license plate number has been pushed in a latest vehicle entry event; and if the target user account is found, pushing the vehicle exit event and fee deduction information of the vehicle to user equipment corresponding to the target user account.

In an embodiment, when the instructions are executed by the user account server, the user account server is enabled to perform the following operations:

after the user account server searches the user accounts bound to the license plate number for the target user account to which the license plate number has been pushed in the latest vehicle entry event, and if the target user account is not found, searching the user accounts bound to the license plate number for a user account supporting fee deduction; and sending fee deduction information of the vehicle to the user account supporting fee deduction.

According to a sixth aspect, this application provides user equipment. The user equipment includes:

one or more processors, a memory, a plurality of applications, and one or more computer programs, where the one or more computer programs are stored in the memory, the one or more computer programs include instructions, and when the instructions are executed by the user equipment, the user equipment is enabled to perform the following operations:

receiving geo-fence information that is of a parking lot and that is sent by a user account server and reporting a notification about a location determination result of user equipment, where a user account corresponding to the user equipment includes a user account bound to a license plate number of a vehicle, and the geo-fence information of the parking lot is sent by the user account server after the user account server receives a vehicle entry event indicating that the vehicle enters the parking lot;

positioning a current location of the user equipment;

determining whether the current location of the user equipment is within a geo-fence range indicated by the geo-fence information;

sending the location determination result of the user equipment to the user account server; and receiving the vehicle entry event that is of the vehicle and that is sent by the user account server, where the vehicle entry event is sent by the user account server after the user account server determines that the current location of the user equipment is within the geo-fence range.

In an embodiment, when the instructions are executed by the user equipment, the user equipment is enabled to perform the following operation:

after receiving the vehicle entry event that is of the vehicle and that is pushed by the user account server, receiving a vehicle exit event of the vehicle and fee deduction information that are sent by the user account server, where the vehicle exit event and the fee deduction information are sent by the user account server after the user account server determines that the user account server has pushed a latest vehicle entry event of the vehicle to the user equipment.

It should be understood that the technical solutions in the third aspect and the fifth aspect of this application are consistent with the technical solution in the first aspect of this application. Beneficial effects achieved in the aspects and the corresponding feasible implementations are similar. Details are not described again.

It should be understood that the technical solutions in the fourth aspect and the sixth aspect of this application are consistent with the technical solution in the second aspect of this application. Beneficial effects achieved in the aspects and the corresponding feasible implementations are similar. Details are not described again.

According to a seventh aspect, this application provides a computer-readable storage medium. The computer-readable storage medium stores a computer program, and when the computer program is run on a computer, the computer is enabled to perform the method according to the first aspect.

According to an eighth aspect, this application provides a computer-readable storage medium. The computer-readable storage medium stores a computer program, and when the computer program is run on a computer, the computer is enabled to perform the method according to the second aspect.

According to a ninth aspect, this application provides a computer program. When being executed by a computer, the computer program is used to perform the method according to the first aspect.

According to a tenth aspect, this application provides a computer program. When being executed by a computer, the computer program is used to perform the method according to the second aspect.

In an embodiment, the program in the ninth aspect and the tenth aspect may be all or partially stored in a storage medium that is encapsulated with a processor, or may be all or partially stored in a memory that is not encapsulated with a processor.

DESCRIPTION OF EMBODIMENTS

Terms used in embodiments of this application are only used for explaining specific embodiments of this application, but are not intended to limit this application.

Figure 1:
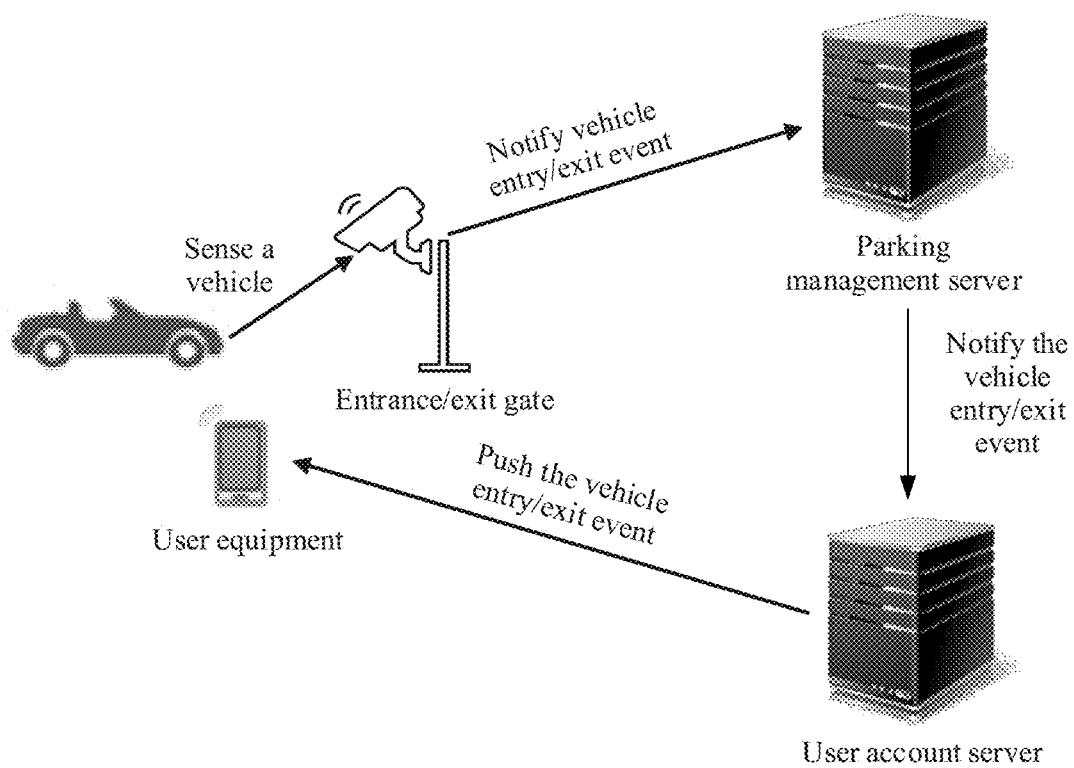
FIG. 1 is a schematic diagram of a frictionless parking system in the conventional technology.

FIG. 1 is a schematic diagram of a frictionless parking system in the conventional technology. As shown in FIG. 1, in the conventional technology, a user binds a user account (for example, a WeChat account) of a platform to a license plate number. After detecting that a vehicle corresponding to the license plate number enters or moves out of a parking lot, a camera at an entrance/exit gate of the parking lot notifies a parking management server of an entry/exit event of the vehicle, and the parking management server pushes the entry/exit event of the vehicle corresponding to the license plate number to a user account server. The user account server obtains, based on the license plate number, the user account bound to the license plate number from a database connected to the user account server, and sends a push message to user equipment corresponding to the user account, to notify of the entry/exit event of the vehicle corresponding to the license plate number. The entry/exit event includes parking lot information.

When the user account is bound to the license plate number, a vehicle owner is not verified. Therefore, it cannot be ensured that this user account is owned by the vehicle owner or a user authorized by the vehicle owner. However, the user account server performs pushing only based on binding information. Consequently, vehicle location information is directly leaked, to cause personal data leakage risks. Currently, an existing mitigation measure is as follows: When a user account is bound to a license plate number, certificate information such as vehicle license and/or ID card information needs to be uploaded for identity authentication. However, this measure violates a principle of minimizing personal data collection, and the uploading of the vehicle license and/or ID card information may cause greater data leakage risks.

This application provides a method for pushing vehicle information. A parking lot sets a geo-fence for a location of the parking lot, and pushes a current vehicle entry/exit event only when user equipment corresponding to a user account bound to a license plate number is within the geo-fence of the parking lot.

If the user equipment is not within the geo-fence of the parking lot, the vehicle entry/exit event is not pushed. However, if none of user equipments corresponding to user accounts bound to the license plate number is within the geo-fence of the parking lot, only a user account supporting fee deduction is used to pay a parking fee. Fee deduction information of a vehicle is sent to the user account supporting fee deduction, but entry and exit time points of the vehicle and specific parking lot information are not reflected, to protect vehicle location information of a user and avoid leakage of the vehicle location information of the user.

Figure 2:
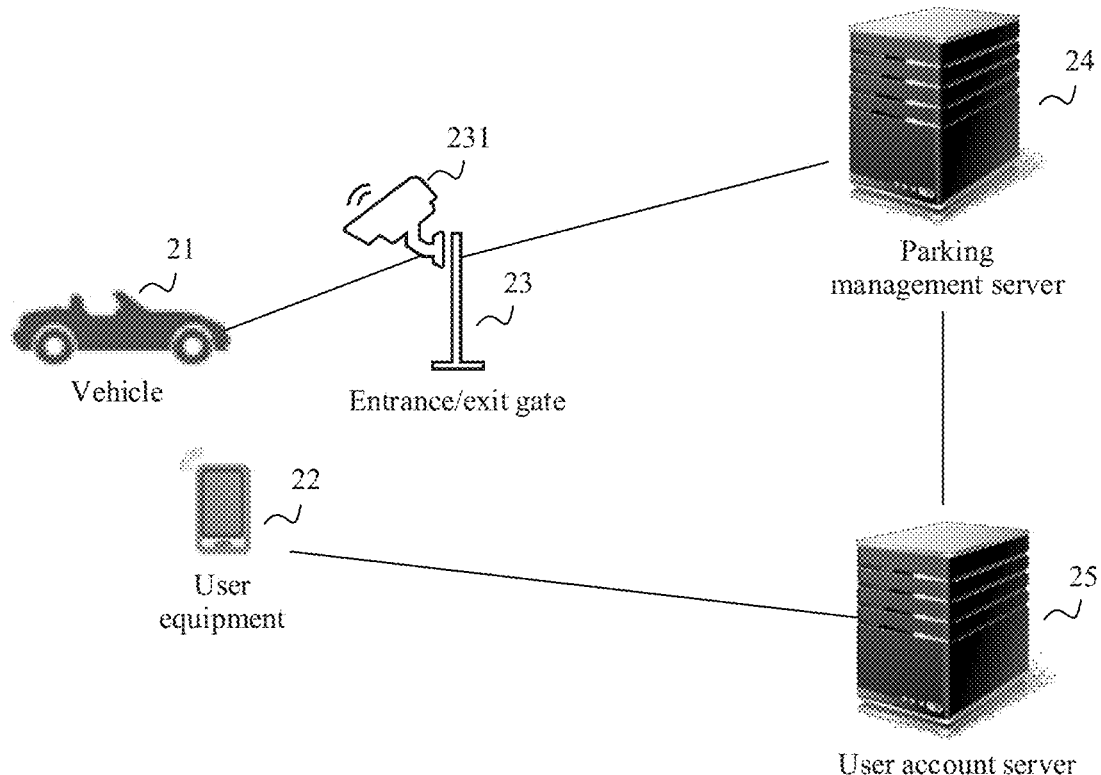
FIG. 2 is a schematic diagram of an application scenario of a method for pushing vehicle information according to this application.

FIG. 2 is a schematic diagram of an application scenario of a method for pushing vehicle information according to this application. As shown in FIG. 2, the method for pushing the vehicle information according to this application relates to one or a combination of the following devices: a vehicle 21, user equipment 22, an entrance/exit gate 23, a parking management server 24, and a user account server 25.

The entrance/exit gate 23 is a gate at an entrance/exit of a parking lot. A camera 231 is disposed at the entrance/exit gate 23 and is configured to scan a license plate number of a vehicle. The entrance/exit gate 23 is connected to the parking management server 24.

The parking management server 24 is a server of a management system of the parking lot, and the parking management server 24 is connected to the user account server 25.

The user account server 25 is connected to the user equipment 22. The user equipment 22 may be an electronic device used by a user, such as a smartphone, a tablet computer, a notebook computer, a wearable intelligent device, an uncrewed aerial vehicle, an intelligent connected vehicle (ICV), a smart/an intelligent car, or an in-vehicle device.

Figure 3:
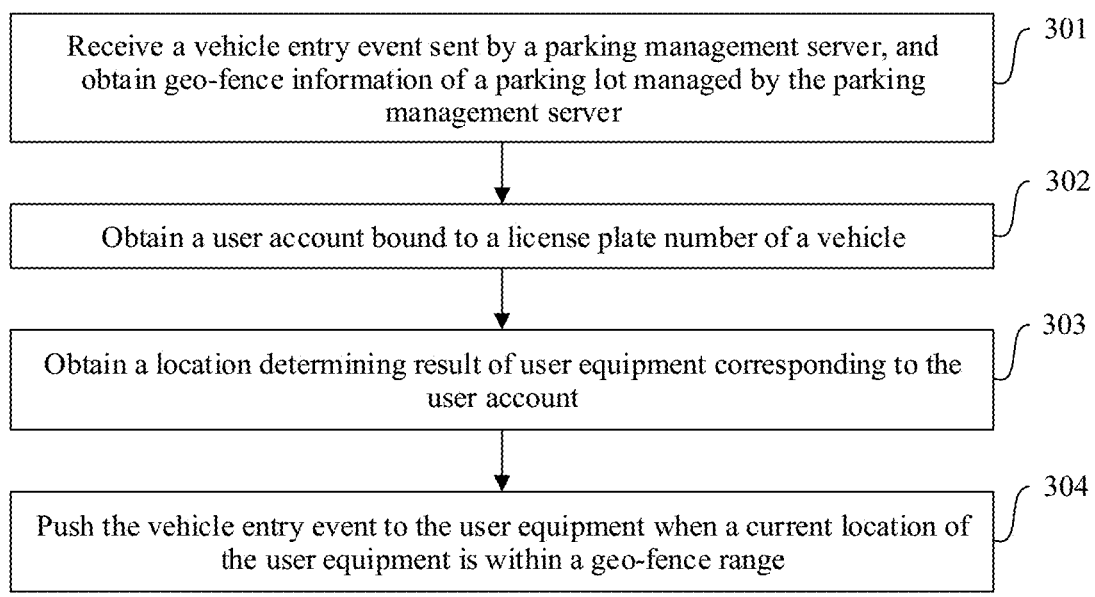
FIG. 3 is a flowchart of an embodiment of a method for pushing vehicle information according to this application.

FIG. 3 is a flowchart of an embodiment of a method for pushing vehicle information according to this application. As shown in FIG. 3, the method for pushing the vehicle information may include the following operations.

Operation 301: Receive a vehicle entry event sent by a parking management server, and obtain geo-fence information of a parking lot managed by the parking management server. The vehicle entry event is sent by the parking management server after the parking management server receives a notification message indicating that a vehicle enters the parking lot, and the vehicle entry event includes a license plate number of the vehicle.

Specifically, refer to FIG. 2. After detecting that the vehicle enters the parking lot, the camera at the entrance/exit gate of the parking lot sends, to the parking management server of the parking lot, the notification message indicating that the vehicle enters the parking lot. The notification message includes the license plate number of the vehicle. In addition, the notification message may further include a moment at which the vehicle enters the parking lot. After receiving the notification message, the parking management server sends the vehicle entry event to the user account server, and the user account server receives the vehicle entry event sent by the parking management server. The vehicle entry event includes the license plate number of the vehicle.

In specific implementation, the parking management server sets the geo-fence information for a location of the managed parking lot. The geo-fence information is a closed range enclosed by a group of location coordinates (such as, longitude and latitude coordinates). The closed range includes the parking lot. Specifically, the closed range may be a square, a circle, a polygon, or another irregular shape. A shape of the closed range is not limited in this embodiment, provided that the closed range includes the parking lot. When a coordinate location of an entity is located in the closed range, it may be considered that the entity is within a range of a geo-fence.

The obtaining the geo-fence information of the parking lot managed by the parking management server may be: The user account server receives the geo-fence information that is of the parking lot and that is sent by the parking management server, that is, the parking management server may send the geo-fence information of the parking lot to the user account server when sending the vehicle entry event to the user account server. In this way, the user account server receives the vehicle entry event sent by the parking management server, and receives the geo-fence information that is of the parking lot and that is sent by the parking management server.

Alternatively, the obtaining the geo-fence information of the parking lot managed by the parking management server may be as follows:

The user account server obtains the prestored geo-fence information of the parking lot, that is, the parking management server may send the geo-fence information of the parking lot to the user account server in advance, and the user account server stores the geo-fence information of the parking lot. After receiving the vehicle entry event sent by the parking management server, the user account server obtains the prestored geo-fence information of the parking lot.

Operation 302: Obtain a user account bound to the license plate number of the vehicle.

Operation 303: Obtain a location determination result of user equipment corresponding to the user account. The location determination result includes a determination result about whether a current location of the user equipment is within a geo-fence range indicated by the geo-fence information.

Operation 304: Push the vehicle entry event to the user equipment when the current location of the user equipment is within the geo-fence range.

In the foregoing method for pushing the vehicle information, after the vehicle entry event sent by the parking management server is received, and the geo-fence information of the parking lot managed by the parking management server is obtained, the user account server obtains the user account bound to the license plate number of the vehicle, and obtains the location determination result of the user equipment corresponding to the user account. Then, the vehicle entry event is pushed to the user equipment when the current location of the user equipment is within the geo-fence range. In this way, even if a user account corresponding to user equipment whose current location is different from a location of the vehicle is bound to the license plate number of the vehicle, the user equipment does not receive pushed information indicating that the vehicle enters the parking lot, so that vehicle location information of a user can be effectively protected.

Figure 4:
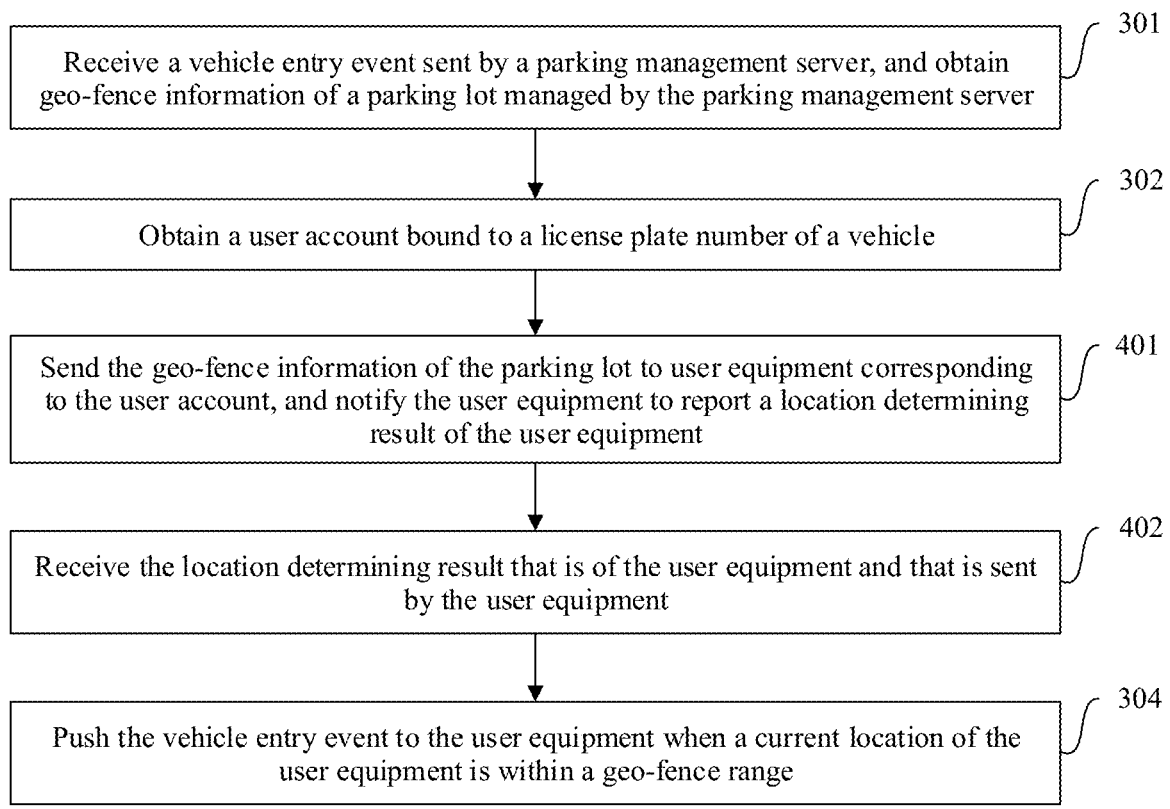
FIG. 4 is a flowchart of another embodiment of a method for pushing vehicle information according to this application.

FIG. 4 is a flowchart of another embodiment of a method for pushing vehicle information according to this application. As shown in FIG. 4, in the embodiment of this application shown in FIG. 3, operation 303 may include the following operations.

Operation 401: Send the geo-fence information of the parking lot to the user equipment corresponding to the user account, and notify the user equipment to report the location determination result of the user equipment.

Operation 402: Receive the location determination result that is of the user equipment and that is sent by the user equipment. The location determination result is sent by the user equipment after the user equipment positions the current location of the user equipment and determines whether the current location of the user equipment is within the geo-fence range indicated by the geo-fence information.

That is, in this embodiment, the user account server sends the geo-fence information of the parking lot to the user equipment, and notifies the user equipment to report the location determination result. After the user equipment positions the current location of the user equipment and determines whether the current location of the user equipment is within the geo-fence range indicated by the geo-fence information, the user account server receives the location determination result that is of the user equipment and that is sent by the user equipment, to push, based on the location determination result of the user equipment, the vehicle entry event to the user equipment only when the current location of the user equipment is within the geo-fence range. This effectively protects the vehicle location information of the user.

Figure 5:
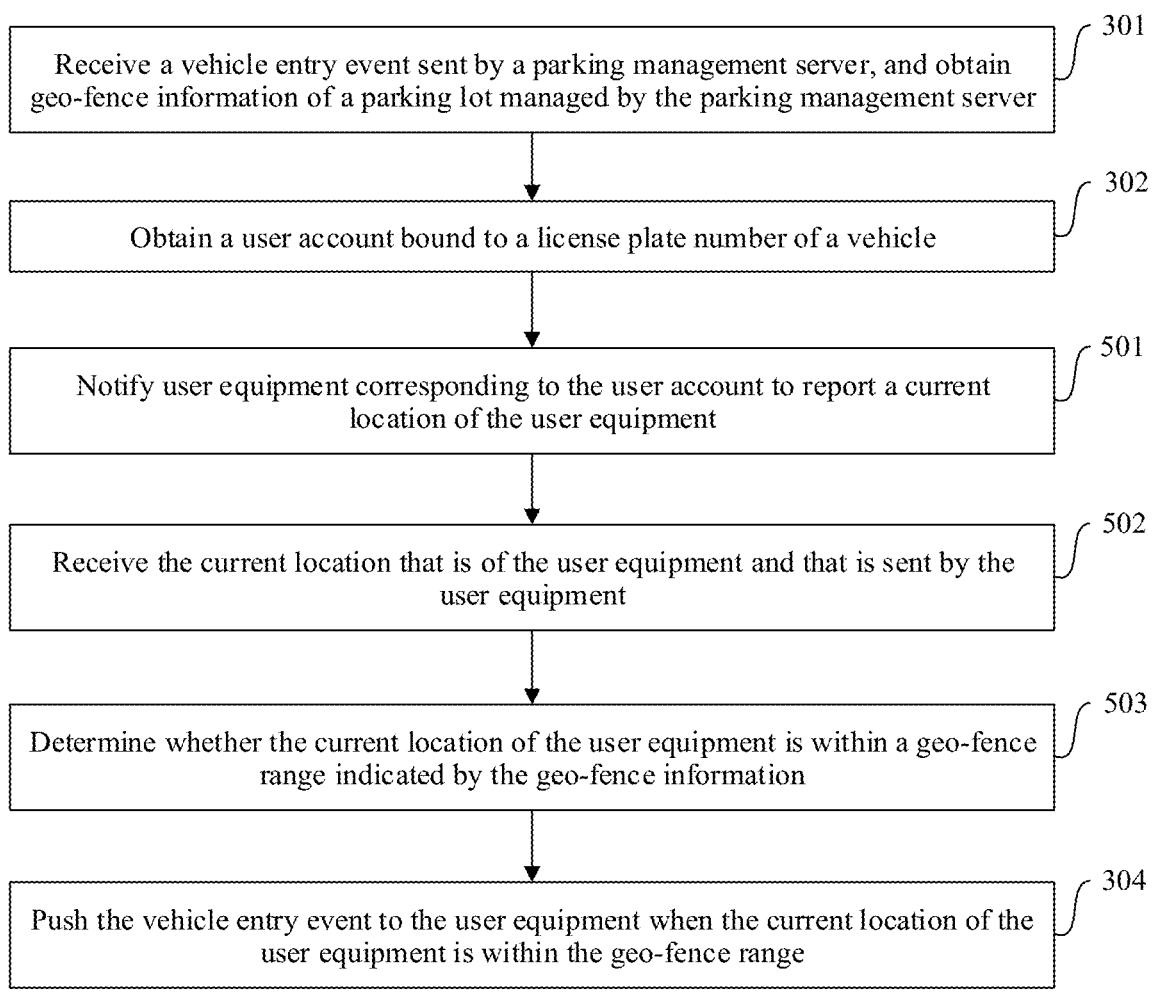
FIG. 5 is a flowchart of still another embodiment of a method for pushing vehicle information according to this application.

FIG. 5 is a flowchart of still another embodiment of a method for pushing vehicle information according to this application. As shown in FIG. 5, in the embodiment of this application shown in FIG. 3, operation 303 may include the following operations.

Operation 501: Notify the user equipment corresponding to the user account to report the current location of the user equipment.

Operation 502: Receive the current location that is of the user equipment and that is sent by the user equipment.

Operation 503: Determine whether the current location of the user equipment is within the geo-fence range indicated by the geo-fence information.

That is, in this embodiment, the user account server may notify the user equipment corresponding to the user account to report the current location of the user equipment, and then receive the current location that is of the user equipment and that is sent by the user equipment. Next, the user account server determines whether the current location of the user equipment is within the geo-fence range indicated by the geo-fence information, to obtain the location determination result of the user equipment. Specifically, the geo-fence information is a closed range enclosed by a group of location coordinates (such as, longitude and latitude coordinates). If the user account server determines that coordinates of the current location of the user equipment are within the closed range, it may be determined that the user equipment is within the geo-fence range. Alternatively, if the user account server determines that coordinates of the current location of the user equipment are not within the closed range, it may be determined that the user equipment is not within the geo-fence range. After obtaining the location determination result of the user equipment, the user account server may push, based on the location determination result of the user equipment, the vehicle entry event to the user equipment only when the current location of the user equipment is within the geo-fence range. This effectively protects the vehicle location information of the user.

Figure 6:
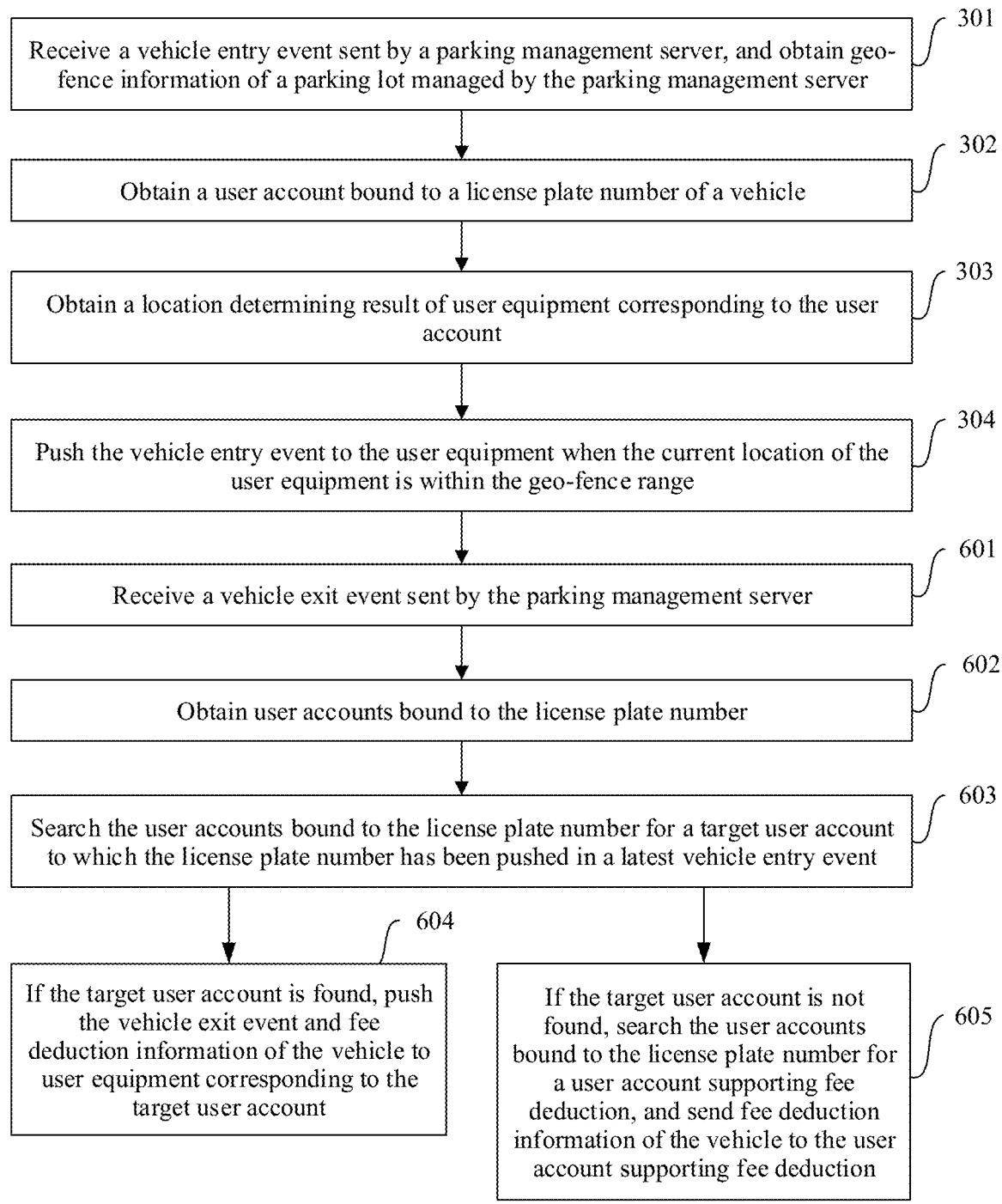
FIG. 6 is a flowchart of still another embodiment of a method for pushing vehicle information according to this application.

FIG. 6 is a flowchart of still another embodiment of a method for pushing vehicle information according to this application. As shown in FIG. 6, in the embodiment of this application shown in FIG. 3, after operation 304, the method may further include the following operations.

Operation 601: Receive a vehicle exit event sent by the parking management server. The vehicle exit event is sent by the parking management server after the parking management server receives a notification message indicating that the vehicle moves out of the parking lot, and the vehicle exit event includes the license plate number of the vehicle.

Specifically, refer to FIG. 2. After detecting that the vehicle moves out of the parking lot, the camera at the entrance/exit gate of the parking lot sends, to the parking management server of the parking lot, the notification message indicating that the vehicle moves out of the parking lot. The notification message includes the license plate number of the vehicle. In addition, the notification message may further include a moment at which the vehicle moves out of the parking lot. After receiving the notification message, the parking management server sends the vehicle exit event to the user account server, and the user account server receives the vehicle exit event sent by the parking management server. The vehicle exit event includes the license plate number of the vehicle.

Operation 602: Obtain user accounts bound to the license plate number.

Operation 603: Search the user accounts bound to the license plate number for a target user account to which the license plate number has been pushed in a latest vehicle entry event. Then perform operation 604 or operation 605.

The target user account includes a user account to which the license plate number has been pushed in the latest vehicle entry event. The latest vehicle entry event is a vehicle entry event corresponding to the current vehicle exit event.

Operation 604: If the target user account is found, push the vehicle exit event and fee deduction information of the vehicle to user equipment corresponding to the target user account.

Operation 605: If the target user account is not found, search the user accounts bound to the license plate number for a user account supporting fee deduction, and send fee deduction information of the vehicle to the user account supporting fee deduction.

In other words, in this embodiment, the user account server pushes the vehicle exit event and the fee deduction information of the vehicle only to the user equipment corresponding to the target user account. The target user account is the user account to which the user account server has pushed the latest vehicle entry event. According to the method provided in the embodiment of this application shown in FIG. 3, the user account server pushes the vehicle entry event to the user equipment when the current location of the user equipment is within the geo-fence range. In this way, even if a user account corresponding to the user equipment whose current location is different from a location of the vehicle is bound to the license plate number of the vehicle, the user equipment does not receive pushed information indicating that the vehicle moves out of the parking lot. In addition, if the user account server does not find the target user account, the user account server sends only the fee deduction information of the vehicle to the user account supporting fee deduction, and does not push the vehicle exit event. This can effectively protect the vehicle location information of the user, and avoid leakage of the vehicle location information of the user.

Figure 7:
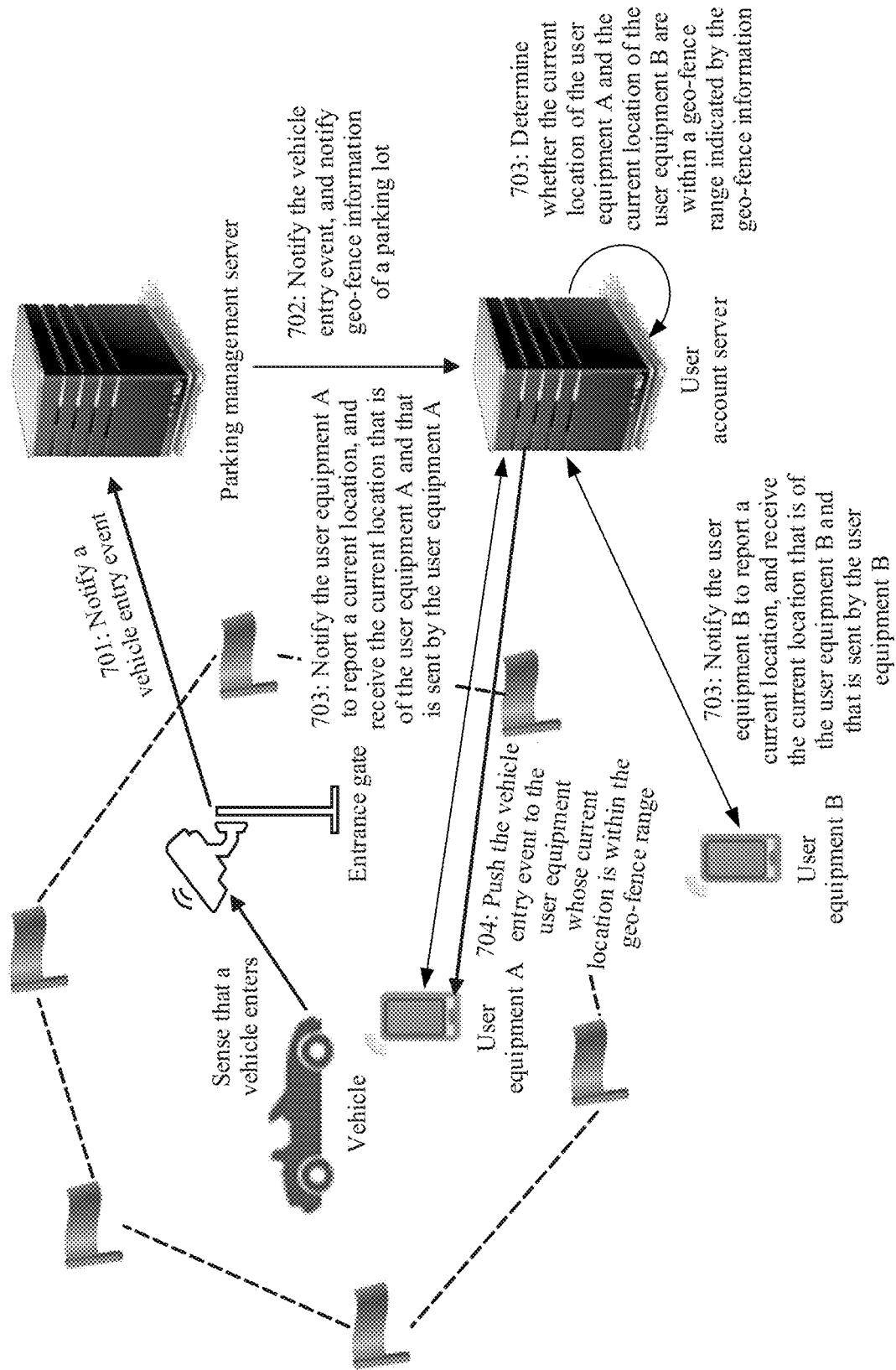
FIG. 7 is a flowchart of still another embodiment of a method for pushing vehicle information according to this application.

FIG. 7 is a flowchart of still another embodiment of a method for pushing vehicle information according to this application. As shown in FIG. 7, the method for pushing the vehicle information may include the following operations.

Operation 701: When a vehicle enters a parking lot and is scanned by a camera disposed at an entrance gate of the parking lot, the camera sends, to a parking management server, a notification message indicating that the vehicle enters the parking lot.

Operation 702: The parking management server sends a vehicle entry event of the vehicle to a user account server, where the vehicle entry event includes a license plate number of the vehicle; and the parking management server sends geo-fence information of the parking lot to the user account server.

Specifically, the parking management server sets a geo-fence for a location of the managed parking lot. The geo-fence information is a closed range enclosed by a group of pieces of location coordinate information. The closed range includes the parking lot. Specifically, the closed range may be a square, a circle, a polygon, or another irregular shape. A shape of the closed range is not limited in this embodiment, provided that the closed range includes the parking lot. When a coordinate location of an entity is within the closed range, it may be considered that the entity is within a range of the geo-fence.

In this embodiment, when sending the vehicle entry event, the parking management server sends the geo-fence information of the parking lot to the user account server. Certainly, this embodiment is not limited thereto. The parking management server may alternatively send the geo-fence information of the parking lot to the user account server in advance. The user account server stores the geo-fence information of the parking lot. After receiving the vehicle entry event, the user account server obtains the stored geo-fence information of the parking lot.

Operation 703: The user account server obtains a user account bound to the license plate number, notifies user equipment corresponding to the user account to report a current location of the user equipment, receives the current location that is of the user equipment and that is sent by the user equipment, and determines whether the current location of the user equipment is within a geo-fence range indicated by the geo-fence information.

Operation 704: The user account server pushes, based on a location determination result, the vehicle entry event to the user equipment only when the current location of the user equipment is within the geo-fence range.

Specifically, refer to FIG. 7. After receiving location determination results sent by user equipment A and user equipment B, the user account server finds that the location determination result of the user equipment A indicates that a current location of the user equipment A is within the geo-fence range, and the location determination result of the user equipment B indicates that a current location of the user equipment B is not within the geo-fence range. Therefore, the user account server pushes the vehicle entry event only to the user equipment A.

Figure 8:
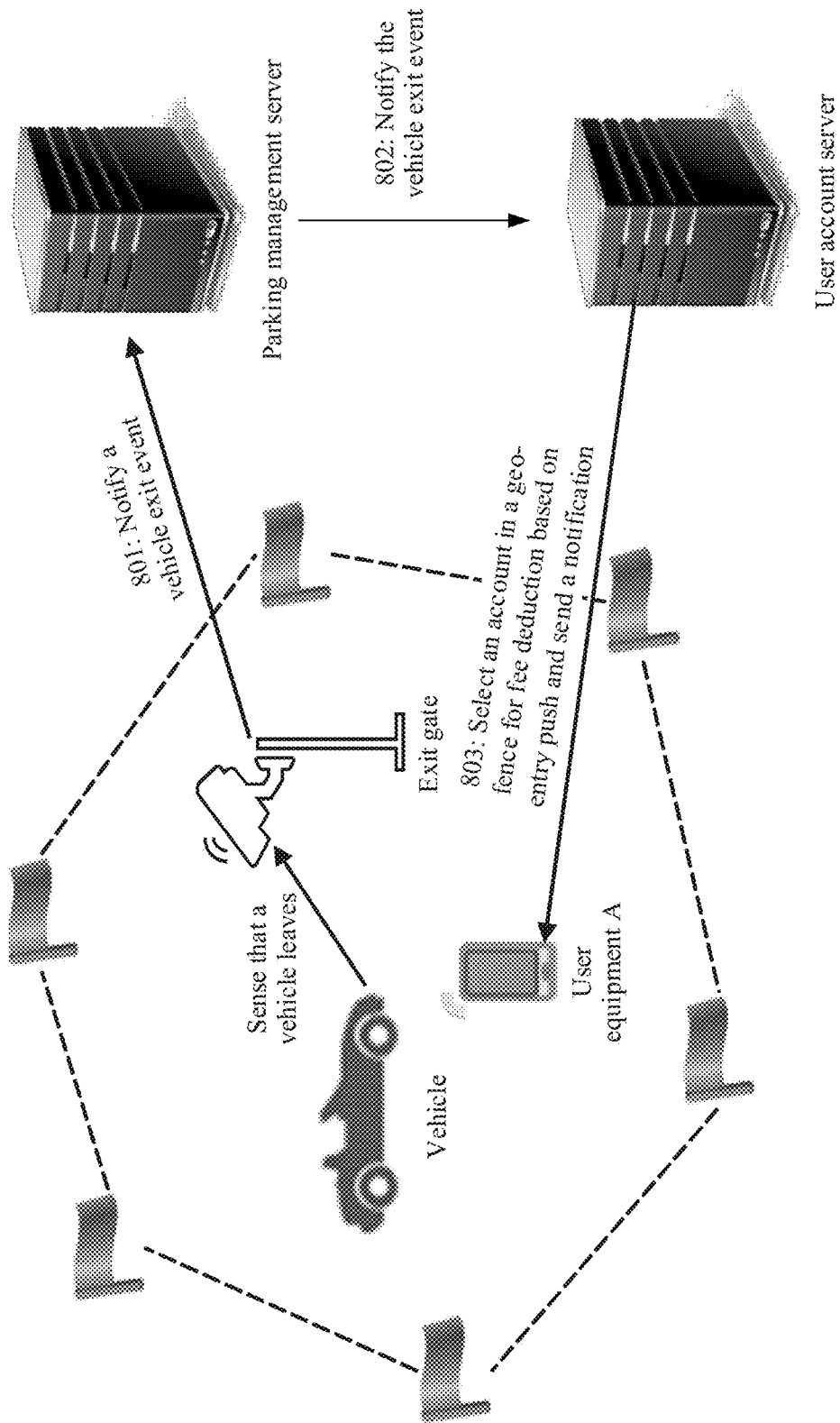
FIG. 8 is a flowchart of still another embodiment of a method for pushing vehicle information according to this application.

FIG. 8 is a flowchart of still another embodiment of a method for pushing vehicle information according to this application. This embodiment describes the method for pushing the vehicle information when a vehicle leaves in a scenario shown in FIG. 7. As shown in FIG. 8, the method for pushing the vehicle information may include the following operations.

Operation 801: When the vehicle moves out of the parking lot and is scanned by a camera disposed at an exit gate of the parking lot, the camera sends, to the parking management server, a notification message indicating that the vehicle moves out of the parking lot.

Operation 802: The parking management server sends a vehicle exit event of the vehicle to the user account server. The vehicle exit event includes the license plate number of the vehicle.

Operation 803: The user account server obtains user accounts bound to the license plate number, searches the user accounts bound to the license plate number for a target user account to which the license plate number has been pushed in a latest vehicle entry event, and if the target user account is found, pushes the vehicle exit event and fee deduction information of the vehicle to user equipment corresponding to the target user account.

Specifically, refer to FIG. 8. The user account server obtains the user accounts bound to the license plate number, and finds, from the user accounts bound to the license plate number, the user account corresponding to the user equipment A that is the target user account to which the latest vehicle entry event has been pushed. Therefore, the user account server pushes the vehicle exit event and the fee deduction information of the vehicle to the user equipment A.

In the embodiments of this application shown in FIG. 7 and FIG. 8, when the vehicle enters or exits the parking lot, the user account server no longer performs pushing only based on information about binding between a user account and a license plate number, but determines whether user equipment corresponding to a user account bound to the license plate number is within a geo-fence range set in the parking lot. If the user equipment and the vehicle are not within the same geo-fence range of the parking lot, no push is performed. If the user equipment and the vehicle are within the same geo-fence range of the parking lot, push is performed. This can effectively protect the vehicle location information of the user.

Figure 9:
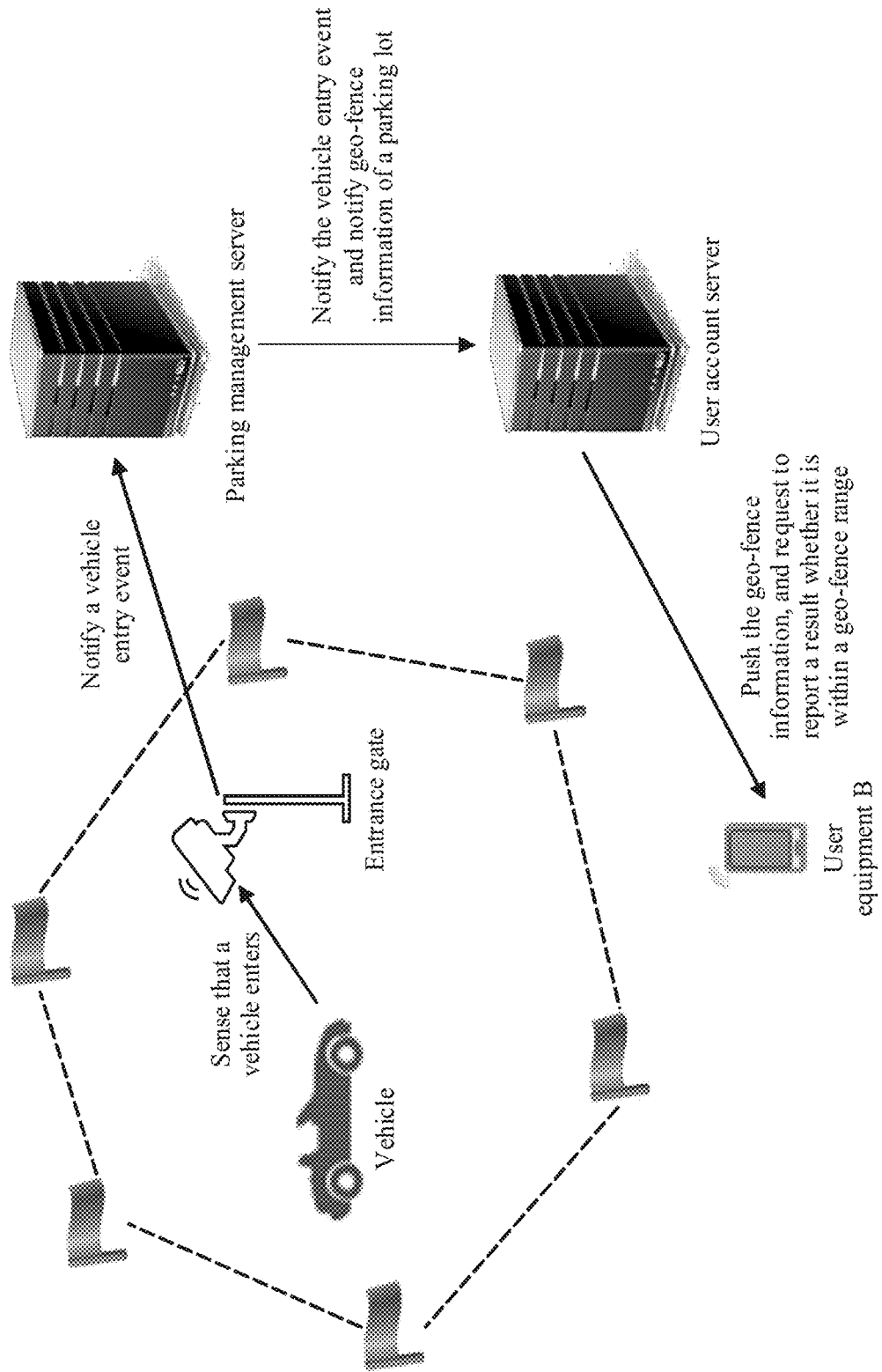
FIG. 9 is a schematic diagram of still another embodiment of a method for pushing vehicle information according to this application.

FIG. 9 is a schematic diagram of still another embodiment of a method for pushing vehicle information according to this application. Differences between the embodiment shown in FIG. 9 and the embodiment shown in FIG. 7 are as follows: After a user account server obtains user accounts bound to a license plate number, sends geo-fence information of a parking lot to user equipments corresponding to the user accounts, and notifies the user equipments to report location determination results of the user equipments, the user account server receives a location determination result sent by the user equipment B. The user account server determines, based on the location determination result of the user equipment B, that a current location of the user equipment B is not within a geo-fence range. In this way, the user account server determines that all the user equipments corresponding to the user accounts are not within the geo-fence range. Therefore, the user account server does not push the vehicle entry event to any user equipment.

Figure 10:
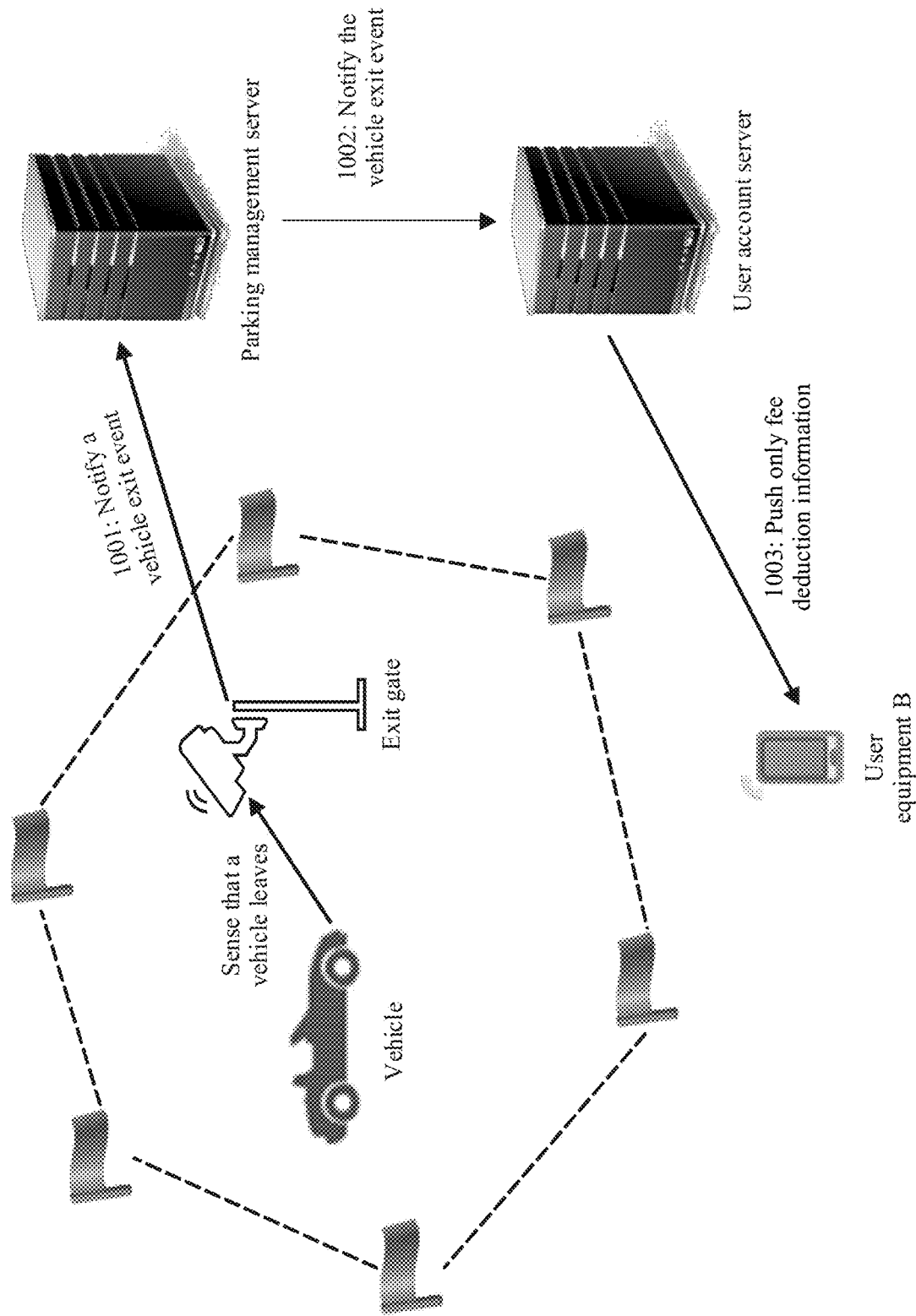
FIG. 10 is a flowchart of still another embodiment of a method for pushing vehicle information according to this application.

FIG. 10 is a flowchart of still another embodiment of a method for pushing vehicle information according to this application. This embodiment describes the method for pushing the vehicle information when a vehicle leaves in a scenario shown in FIG. 9. As shown in FIG. 10, the method for pushing the vehicle information may include the following operations.

Operation 1001: When a vehicle moves out of the parking lot and is scanned by a camera disposed at an exit gate of the parking lot, the camera sends, to a parking management server, a notification message indicating that the vehicle moves out of the parking lot.

Operation 1002: The parking management server sends a vehicle exit event of the vehicle to the user account server. The vehicle exit event includes the license plate number of the vehicle.

Operation 1003: The user account server obtains user accounts bound to the license plate, and searches the user accounts bound to the license plate for a target user account to which the license plate has been pushed in a latest vehicle entry event. In this embodiment, the user account server does not find the target user account. Therefore, the user account server searches the user accounts bound to the license plate for a user account supporting fee deduction, and sends fee deduction information of the vehicle to the user account supporting fee deduction.

Specifically, refer to FIG. 10. After obtaining the user accounts bound to the license plate number, the user account server does not find, from the bound user accounts, the target user account to which the license plate number has been pushed in the latest vehicle entry event. Therefore, the user account server may search, according to a user-preset sequence, the user accounts bound to the license plate number for the user account supporting parking fee deduction, and directly push the fee deduction information to user equipment (user equipment B in FIG. 10) corresponding to the user account supporting the fee deduction, but the vehicle exit event of the vehicle is not pushed.

In the embodiments of this application shown in FIG. 9 and FIG. 10, even if a user account corresponding to user equipment whose current location is different from a location of the vehicle is bound to the license plate number of the vehicle, the user equipment does not receive pushed information indicating that the vehicle enters/moves out of the parking lot. During exit fee deduction, although the user account server automatically selects the user account for fee deduction, the user account server pushes only the fee deduction information to the user account supporting fee deduction, and does not push the vehicle exit event, so that vehicle location information of a user can be effectively protected.

Figure 11:
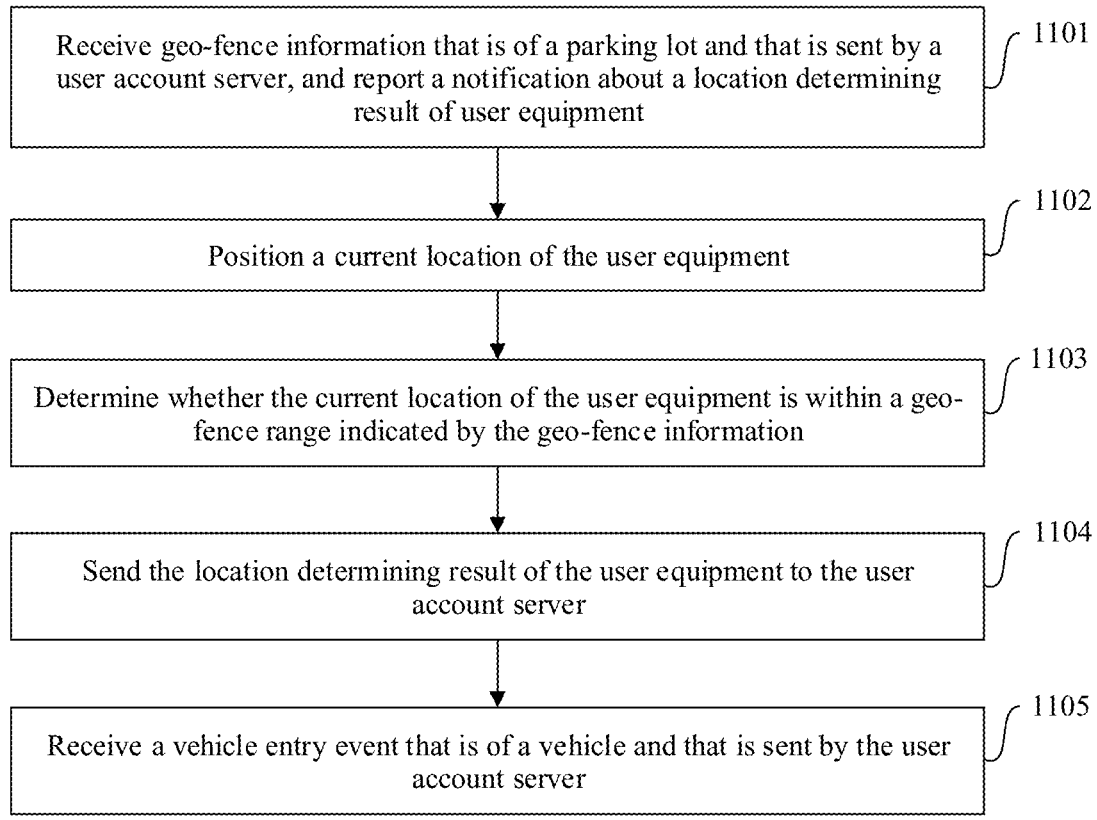
FIG. 11 shows still another embodiment of a method for pushing vehicle information according to this application.

FIG. 11 shows still another embodiment of a method for pushing vehicle information according to this application. As shown in FIG. 11, the method for pushing the vehicle information may include the following operations.

Operation 1101: Receive geo-fence information that is of a parking lot and that is sent by a user account server, and report a notification about a location determination result of user equipment, where a user account corresponding to the user equipment includes a user account bound to a license plate number of a vehicle, and the geo-fence information of the parking lot is sent by the user account server after the user account server receives a vehicle entry event indicating that the vehicle enters the parking lot.

Operation 1102: Position a current location of the user equipment.

Operation 1103: Determine whether the current location of the user equipment is within a geo-fence range indicated by the geo-fence information.

Specifically, the geo-fence information is a closed range enclosed by a group of location coordinates (such as, longitude and latitude coordinates). If the user equipment determines that coordinates of the current location of the user equipment are within the closed range, it may be determined that the user equipment is within the geo-fence range. Alternatively, if the user equipment determines that coordinates of the current location of the user equipment are not within the closed range, it may be determined that the user equipment is not within the geo-fence range.

Operation 1104: Send the location determination result of the user equipment to the user account server.

Operation 1105: Receive the vehicle entry event that is of the vehicle and that is sent by the user account server, where the vehicle entry event is sent by the user account server after the user account server determines that the current location of the user equipment is within the geo-fence range.

Further, in an embodiment, after operation 1105, the method may further include:

receiving a vehicle exit event of the vehicle and fee deduction information that are sent by the user account server, where the vehicle exit event and the fee deduction information are sent by the user account server after the user account server determines that the user account server has pushed a latest vehicle entry event of the vehicle to the user equipment.

In this embodiment, after receiving the geo-fence information that is of the parking lot and that is sent by the user account server and reporting the notification about the location determination result of the user equipment, the user equipment determines whether the current location of the user equipment is within the geo-fence range indicated by the geo-fence information, sends the location determination result to the user account server, and then receives the vehicle entry event that is of the vehicle and that is sent by the user account server. The vehicle entry event is sent after the user account server determines that the current location of the user equipment is within the geo-fence range. In this way, even if a user account corresponding to user equipment whose current location is different from a location of the vehicle is bound to the license plate number of the vehicle, the user equipment does not receive pushed information indicating that the vehicle enters the parking lot, so that vehicle location information of a user can be effectively protected.

It may be understood that some or all of the operations or operations in the foregoing embodiments are merely examples. In embodiments of this application, other operations or variations of various operations may be further performed. In addition, the operations may be performed in a sequence different from that presented in the foregoing embodiments, and not all operations in the foregoing embodiments may need to be performed.

Figure 12:
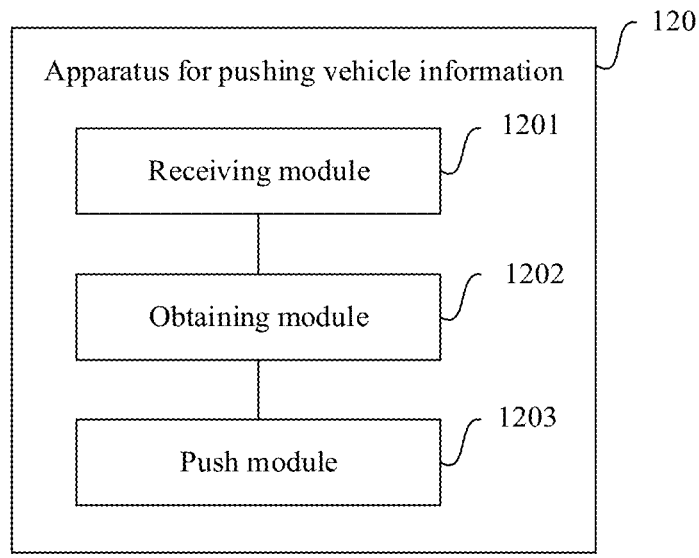
FIG. 12 is a schematic diagram of a structure of an embodiment of an apparatus for pushing vehicle information according to this application.

FIG. 12 is a schematic diagram of a structure of an embodiment of an apparatus for pushing vehicle information according to this application. As shown in FIG. 12, the foregoing apparatus 120 for pushing the vehicle information may include a receiving module 1201, an obtaining module 1202, and a push module 1203. It should be understood that the apparatus 120 for pushing the vehicle information may correspond to the user account server in FIG. 2, FIG. 7, FIG. 8, FIG. 9, or FIG. 10, or may correspond to a user account server 900 in FIG. 15. The obtaining module 1202 may correspond to a processor 910 in the user account server 900 shown in FIG. 15. The receiving module 1201 and the push module 1203 may correspond to a transceiver 920 in the user account server 900 shown in FIG. 15.

The receiving module 1201 is configured to receive a vehicle entry event sent by a parking management server. The vehicle entry event is sent by the parking management server after the parking management server receives a notification message indicating that a vehicle enters the parking lot, and the vehicle entry event includes a license plate number of the vehicle.

The obtaining module 1202 is configured to: obtain geo-fence information of the parking lot managed by the parking management server; obtain a user account bound to the license plate number of the vehicle; and obtain a location determination result of user equipment corresponding to the user account. The location determination result includes a determination result about whether a current location of the user equipment is within a geo-fence range indicated by the geo-fence information.

The push module 1203 is configured to push the vehicle entry event to the user equipment when the current location of the user equipment is within the geo-fence range.

The apparatus 120 for pushing the vehicle information in the embodiment shown in FIG. 12 may be configured to perform the technical solution in the method embodiment shown in FIG. 3 in this application. For an implementation principle and a technical effect of the apparatus, further refer to related descriptions in the method embodiment.

Figure 13:
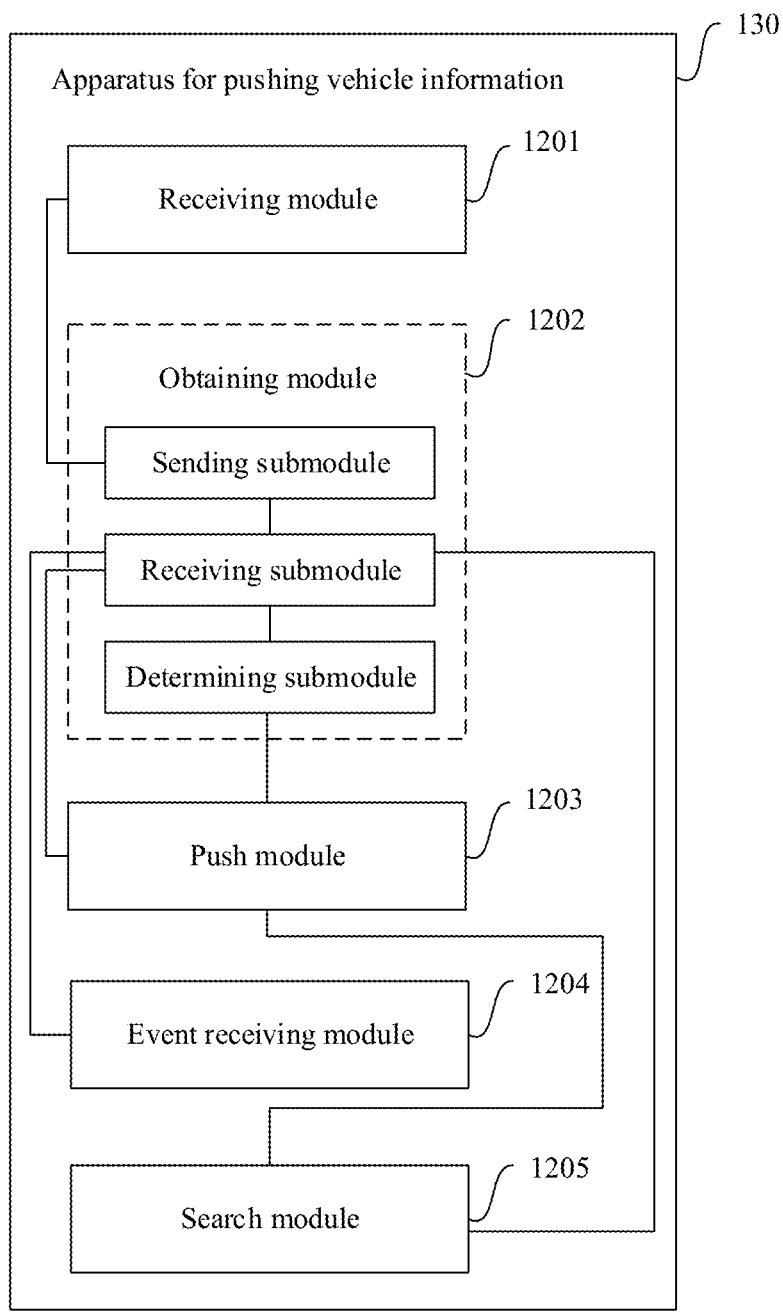
FIG. 13 is a schematic diagram of a structure of another embodiment of an apparatus for pushing vehicle information according to this application.

FIG. 13 is a schematic diagram of a structure of another embodiment of an apparatus for pushing vehicle information according to this application. It should be understood that the apparatus 130 for pushing the vehicle information provided in the embodiment shown in FIG. 13 may correspond to the user account server in FIG. 2, FIG. 7, FIG. 8, FIG. 9, or FIG. 10, or may correspond to the user account server in FIG. 15.

Differences between the apparatus 130 for pushing the vehicle information and the apparatus 120 for pushing the vehicle information shown in FIG. 12 are as follows: In an embodiment, the obtaining module 1202 may include a sending submodule 12021 and a receiving submodule 12022.

The sending submodule 12021 is configured to: send the geo-fence information of the parking lot to the user equipment corresponding to the user account, and notify the user equipment to report the location determination result of the user equipment.

The receiving submodule 12022 is configured to receive the location determination result that is of the user equipment and that is sent by the user equipment. The location determination result is sent by the user equipment after the user equipment positions the current location of the user equipment and determines whether the current location of the user equipment is within the geo-fence range indicated by the geo-fence information.

In another embodiment, the obtaining module 1202 may include a sending submodule 12021, a receiving submodule 12022, and a determining submodule 12023.

The sending submodule 12021 is configured to notify the user equipment corresponding to the user account to report the current location of the user equipment.

The receiving submodule 12022 is configured to receive the current location that is of the user equipment and that is sent by the user equipment.

The determining submodule 12023 is configured to determine whether the current location of the user equipment is within the geo-fence range indicated by the geo-fence information.

In an embodiment, the apparatus 130 for pushing the vehicle information may further include an event receiving module 1204 and a search module 1205.

The event receiving module 1204 is configured to: after the push module 1203 pushes the vehicle entry event to the user equipment when the current location of the user equipment is within the geo-fence range, receive a vehicle exit event sent by the parking management server. The vehicle exit event is sent by the parking management server after the parking management server receives a notification message indicating that the vehicle moves out of the parking lot, and the vehicle exit event includes the license plate number of the vehicle.

The obtaining module 1202 is further configured to user accounts bound to the license plate number.

The search module 1205 is configured to search the user accounts that are bound to the license plate number and that are obtained by the obtaining module 1202 for a target user account to which the license plate number has been pushed in a latest vehicle entry event.

The push module 1202 is configured to: when the search module 1205 finds the target user account, push the vehicle exit event and fee deduction information of the vehicle to user equipment corresponding to the target user account.

In an embodiment, the search module 1205 is further configured to: after the search module searches the user accounts bound to the license plate number for the target user account to which the license plate number has been pushed in the latest vehicle entry event, and when the target user account is not found, search the user accounts bound to the license plate number for a user account supporting fee deduction.

The push module 1203 is further configured to send fee deduction information of the vehicle to the user account supporting fee deduction.

Figure 15:
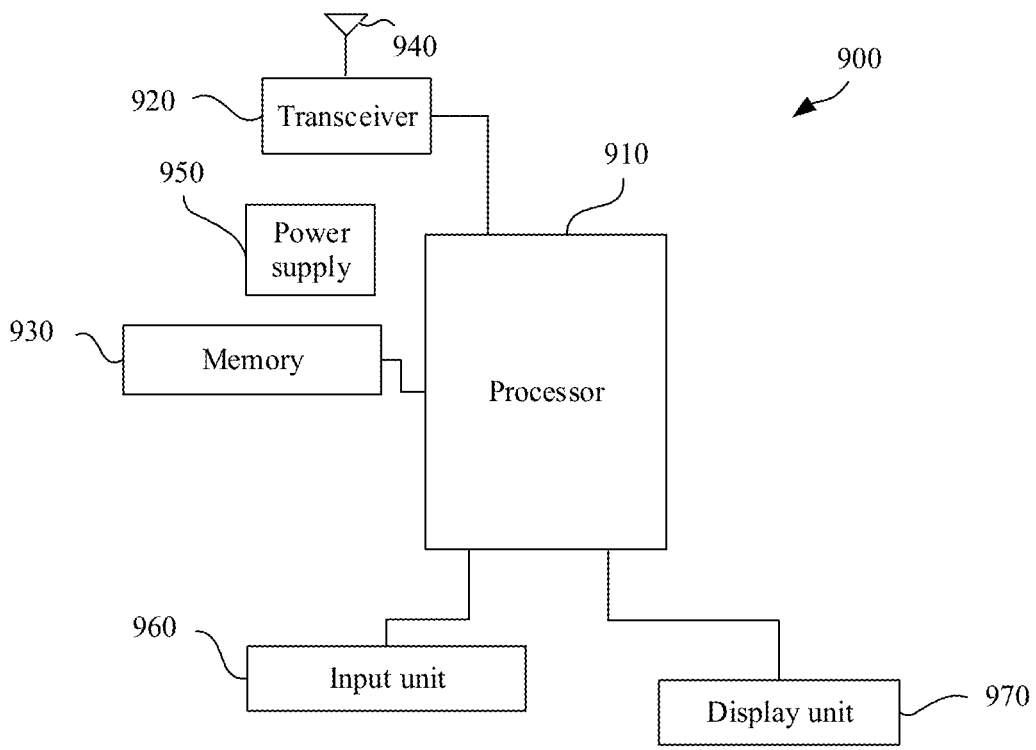
FIG. 15 is a schematic diagram of a structure of an embodiment of a user account server according to this application.

It should be understood that the obtaining module 1202 and the search module 1205 may correspond to the processor 910 in the user account server 900 shown in FIG. 15, and the receiving module 1201, the push module 1203, and the event receiving module 1204 may correspond to the transceiver 920 in the user account server 900 shown in FIG. 15.

The apparatus 120 for pushing the vehicle information in the embodiment shown in FIG. 13 may be configured to perform the technical solutions in the method embodiments shown in FIG. 3 to FIG. 6 in this application. For an implementation principle and a technical effect of the apparatus, further refer to related descriptions in the method embodiments.

Figure 14:
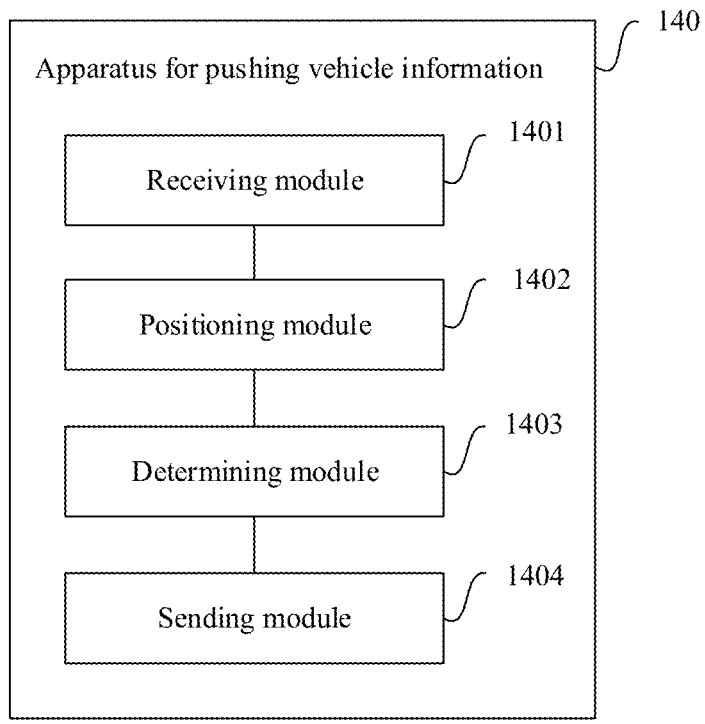
FIG. 14 is a schematic diagram of a structure of still another embodiment of an apparatus for pushing vehicle information according to this application.

FIG. 14 is a schematic diagram of a structure of still another embodiment of an apparatus for pushing vehicle information according to this application. As shown in FIG. 14, the foregoing apparatus 140 for pushing the vehicle information may include a receiving module 1401, a positioning module 1402, a determining module 1403, and a sending module 1404. It should be understood that the apparatus 140 for pushing the vehicle information may correspond to the user equipment in FIG. 2, FIG. 7, FIG. 8, FIG. 9, or FIG. 10, or may correspond to an electronic device 100 in FIG. 16. The receiving module 1401 and the sending module 1404 may correspond to a mobile communications module 150 and/or a wireless communications module 160 in the electronic device 100 shown in FIG. 16. The positioning module 1402 and the determining module 1403 may correspond to a processor 110 in the electronic device 100 shown in FIG. 16.

The receiving module 1401 is configured to receive geo-fence information that is of a parking lot and that is sent by a user account server and report a notification about a location determination result of user equipment. A user account corresponding to the user equipment includes a user account bound to a license plate number of a vehicle, and the geo-fence information of the parking lot is sent by the user account server after the user account server receives a vehicle entry event indicating that the vehicle enters the parking lot.

The positioning module 1402 is configured to position a current location of the user equipment.

The determining module 1403, configured to determine whether the current location of the user equipment is within a geo-fence range indicated by the geo-fence information.

The sending module 1404, configured to send the location determination result of the user equipment to the user account server.

The receiving module 1401 is further configured to receive the vehicle entry event that is of the vehicle and that is sent by the user account server. The vehicle entry event is sent by the user account server after the user account server determines that the current location of the user equipment is within the geo-fence range.

In an embodiment, the receiving module 1401 is further configured to: after receiving the vehicle entry event that is of the vehicle and that is pushed by the user account server, receive a vehicle exit event of the vehicle and fee deduction information that are sent by the user account server. The vehicle exit event and the fee deduction information are sent by the user account server after the user account server determines that the user account server has pushed a latest vehicle entry event of the vehicle to the user equipment.

The apparatus 140 for pushing the vehicle information in the embodiment shown in FIG. 14 may be configured to perform the technical solution in the method embodiment shown in FIG. 11 in this application. For an implementation principle and a technical effect of the apparatus, further refer to related descriptions in the method embodiment.

It should be understood that division of the modules of the apparatuses for pushing the vehicle information shown in FIG. 12 to FIG. 14 is merely logical function division. In actual implementation, all or some of the modules may be integrated into one physical entity, or may be physically separated. In addition, all of the modules may be implemented in a form of software invoked by a processing element or in a form of hardware. Alternatively, a part of the modules may be implemented in a form of software invoked by a processing element, and a part of the modules may be implemented in a form of hardware. For example, the push module may be an independently disposed processing element, or may be integrated into a chip of the user account server for implementation. An implementation of another module is similar to the implementation of the push module. In addition, all or some of these modules may be integrated together, or may be implemented independently. In an implementation process, operations in the foregoing methods or the foregoing modules may be implemented by using a hardware integrated logic circuit in the processing element, or by using instructions in a form of software.

For example, the foregoing modules may be one or more integrated circuits configured to implement implementing the foregoing method, for example, one or more application-specific integrated circuits (ASICs), one or more digital signal processors (DSPs), or one or more field programmable gate arrays (FPGAs). For another example, the modules may be integrated together, and implemented in a form of a system-on-a-chip (SOC).

FIG. 15 is a schematic diagram of a structure of an embodiment of a user account server according to this application. The user account server may include one or more processors, a memory, a plurality of application programs, and one or more computer programs.

The one or more computer programs are stored in the memory. The one or more computer programs include instructions. When the instructions are executed by the user account server, the user account server is enabled to perform the following operations:

receiving a vehicle entry event sent by a parking management server, and obtaining geo-fence information of a parking lot managed by the parking management server, where the vehicle entry event is sent by the parking management server after the parking management server receives a notification message indicating that a vehicle enters the parking lot, and the vehicle entry event includes a license plate number of the vehicle;

obtaining a user account bound to the license plate number of the vehicle;

obtaining a location determination result of user equipment corresponding to the user account, where the location determination result includes a determination result about whether a current location of the user equipment is within a geo-fence range indicated by the geo-fence information; and pushing the vehicle entry event to the user equipment when the current location of the user equipment is within the geo-fence range.

In an embodiment, when the instructions are executed by the user account server, the user account server is enabled to perform the following operations:

sending the geo-fence information of the parking lot to the user equipment corresponding to the user account, and notifying the user equipment to report the location determination result of the user equipment; and receiving the location determination result that is of the user equipment and that is sent by the user equipment, where the location determination result is sent by the user equipment after the user equipment positions the current location of the user equipment and determines whether the current location of the user equipment is within the geo-fence range indicated by the geo-fence information.

In an embodiment, when the instructions are executed by the user account server, the user account server is enabled to perform the following operations:

notifying the user equipment corresponding to the user account to report the current location of the user equipment;

receiving the current location that is of the user equipment and that is sent by the user equipment; and determining whether the current location of the user equipment is within the geo-fence range indicated by the geo-fence information.

In an embodiment, when the instructions are executed by the user account server, the user account server is enabled to perform the following operations:

after the vehicle entry event is pushed to the user equipment when the current location of the user equipment is within the geo-fence range, receiving a vehicle exit event sent by the parking management server, where the vehicle exit event is sent by the parking management server after the parking management server receives a notification message indicating that the vehicle moves out of the parking lot, and the vehicle exit event includes the license plate number of the vehicle;

obtaining user accounts bound to the license plate number;

searching the user accounts bound to the license plate number for a target user account to which the license plate number has been pushed in a latest vehicle entry event; and if the target user account is found, pushing the vehicle exit event and fee deduction information of the vehicle to user equipment corresponding to the target user account.

In an embodiment, when the instructions are executed by the user account server, the user account server is enabled to perform the following operations:

after the user account server searches the user accounts bound to the license plate number for the target user account to which the license plate number has been pushed in the latest vehicle entry event, and if the target user account is not found, searching the user accounts bound to the license plate number for a user account supporting fee deduction; and sending fee deduction information of the vehicle to the user account supporting fee deduction.

The user account server shown in FIG. 15 may be configured to perform functions/operations in the methods provided in the embodiments shown in FIG. 3 to FIG. 6 of this application.

As shown in FIG. 15, the user account server 900 includes a processor 910 and a transceiver 920. Optionally, the user account server 900 may further include a memory 930. The processor 910, the transceiver 920, and the memory 930 may communicate with each other through an internal connection path to transfer a control signal and/or a data signal. The memory 930 is configured to store computer programs. The processor 910 is configured to: invoke and run the computer programs in the memory 930.

Optionally, the user account server 900 may further include an antenna 940, configured to send a wireless signal output by the transceiver 920.

The processor 910 and the memory 930 may be integrated into one processing apparatus, or more commonly be components independent of each other. The processor 910 is configured to execute program code stored in the memory 930 to implement the foregoing functions. During specific implementation, the memory 930 may also be integrated into the processor 910, or may be independent of the processor 910.

In addition, to improve functions of the user account server 900, the user account server 900 may further include one or more of an input unit 960 and a display unit 970.

Optionally, the user account server 900 may further include a power supply 950, configured to supply power to various components or circuits in a terminal device.

It should be understood that the user account server 900 shown in FIG. 15 can implement the processes of the methods provided in the embodiments shown in FIG. 3 to FIG. 6. Operations and/or functions of modules in the user account server 900 are separately intended to implement corresponding procedures in the foregoing method embodiments. For details, refer to the descriptions in the method embodiments shown in FIG. 3 to FIG. 6. To avoid repetition, detailed descriptions are properly omitted herein.

It should be understood that the processor 910 in the user account server 900 shown in FIG. 15 may be a system-on-a-chip SOC, and the processor 910 may include a central processing unit (CPU), and may further include another type of processor, for example, a graphics processing unit (GPU).

In conclusion, some processors or processing units in the processor 910 may operate together to implement the procedure of the foregoing method, and software programs corresponding to the processors or processing units may be stored in the memory 930.

Figure 16:
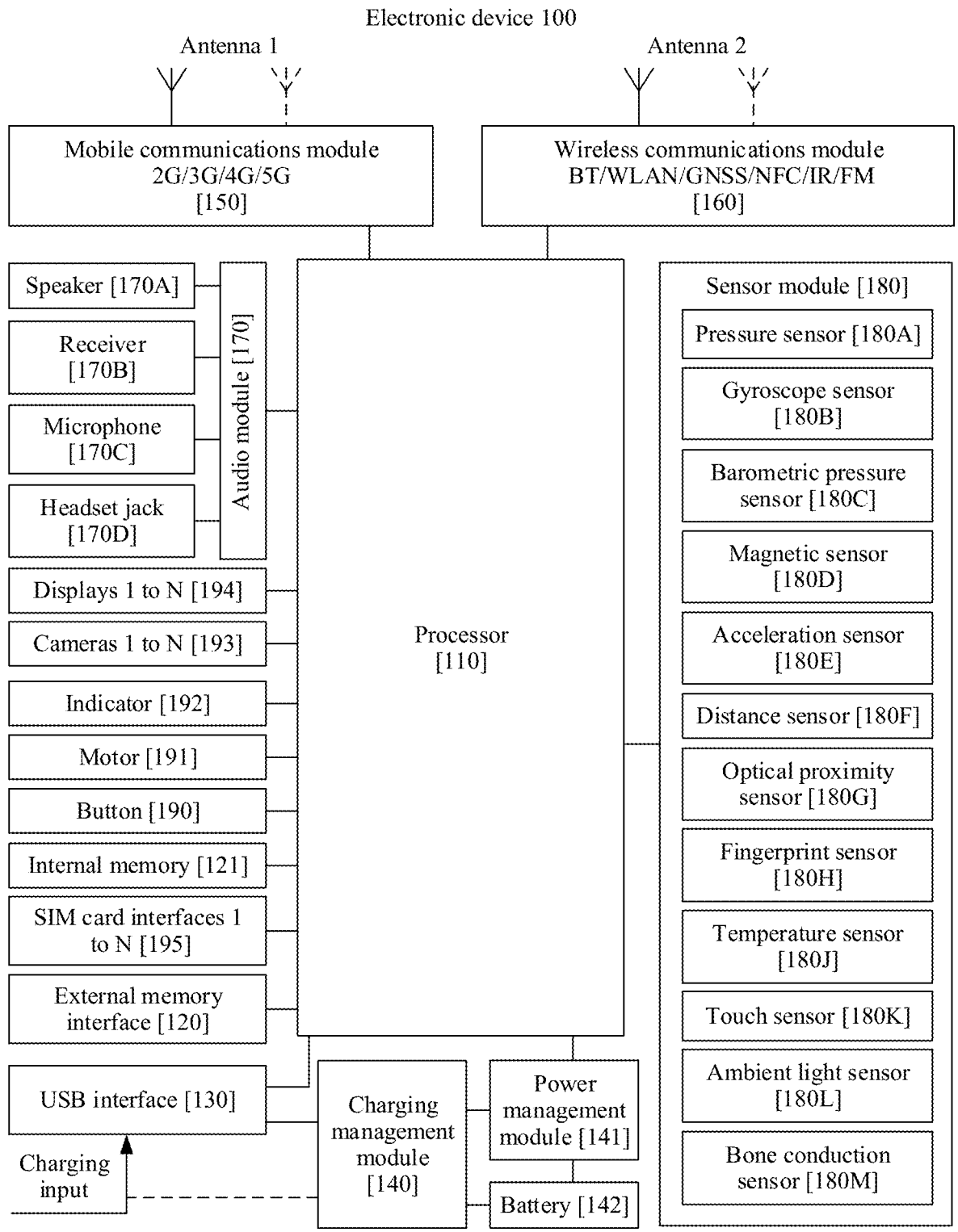
FIG. 16 is a schematic diagram of a structure of an embodiment of user equipment according to this application.

FIG. 16 is a schematic diagram of a structure of an embodiment of user equipment according to this application. The user equipment may be an electronic device used by a user, such as a smartphone, a tablet computer, a notebook computer, a wearable intelligent device, an uncrewed aerial vehicle, an intelligent connected vehicle (ICV), a smart/an intelligent car, or an in-vehicle device.

The user equipment may include one or more processors, a memory, a plurality of applications, and one or more computer programs.

The one or more computer programs are stored in the memory. The one or more computer programs include instructions. When the instructions are executed by the equipment, the equipment is enabled to perform the following operations:

receiving geo-fence information that is of a parking lot and that is sent by a user account server and reporting a notification about a location determination result of user equipment, where a user account corresponding to the user equipment includes a user account bound to a license plate number of a vehicle, and the geo-fence information of the parking lot is sent by the user account server after the user account server receives a vehicle entry event indicating that the vehicle enters the parking lot;

positioning a current location of the user equipment;

determining whether the current location of the user equipment is within a geo-fence range indicated by the geo-fence information;

sending the location determination result of the user equipment to the user account server; and receiving the vehicle entry event that is of the vehicle and that is sent by the user account server, where the vehicle entry event is sent by the user account server after the user account server determines that the current location of the user equipment is within the geo-fence range.

In an embodiment, when the instructions are executed by the user equipment, the user equipment is enabled to perform the following operation:

after receiving the vehicle entry event that is of the vehicle and that is pushed by the user account server, receiving a vehicle exit event of the vehicle and fee deduction information that are sent by the user account server, where the vehicle exit event and the fee deduction information are sent by the user account server after the user account server determines that the user account server has pushed a latest vehicle entry event of the vehicle to the user equipment.

The user equipment shown in FIG. 16 may be configured to perform functions/operations in the method provided in the embodiment of this application shown in FIG. 11.

The user equipment shown in FIG. 16 may be an electronic device, or may be a circuit device built in the electronic device.

FIG. 16 is a schematic diagram of a structure of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The controller may generate an operation control signal based on an instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, to sample, quantize, and encode an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral device such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset, to play audio through the headset. This interface may be further configured to connect to another electronic device such as an AR device.

It may be understood that an interface connection relationship between modules illustrated in embodiments of this application is merely an example for description, and does not constitute a limitation on the structure of the electronic device 100. In some other embodiments of this application, the electronic device 100 may alternatively use an interface connection manner different from an interface connection manner in this embodiment, or use a combination of a plurality of interface connection manners.

The charging management module 140 is configured to receive a charging input from the charger. The charger may be a wireless charger, or may be a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA for show below), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in the same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video on the display 194. In some embodiments, the modem processor may be an independent device. In some other embodiments, the modem processor may be independent of the processor 110, and is disposed in the same device as the mobile communications module 150 or another functional module.

The wireless communications module 160 may provide a wireless communication solution that is applied to the electronic device 100 and that includes a wireless local area network (WLAN for show below) (for example, a wireless fidelity (Wi-Fi for show below) network), Bluetooth (BT for show below), a global navigation satellite system (GNSS for show below), frequency modulation (FM for show below), near field communication (NFC for show below), an infrared (IR for show below) technology, or the like. The wireless communications module 160 may be one or more devices integrating at least one communications processing module.

The wireless communications module 160 receives an electromagnetic wave through the antenna 2, performs processing such as filtering or amplification on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the electronic device 100 are coupled, and the antenna 2 and the wireless communications module 160 are coupled, so that the electronic device 100 may communicate with a network and another device by using a wireless communications technology. The wireless communications technology may include a global system for mobile communications (GSM for show below), a general packet radio service (GPRS for show below), code division multiple access (CDMA for show below), wideband code division multiple access (WCDMA for show below), time-division code division multiple access (TD-CDMA for show below), long term evolution (LTE for show below), BT, a GNSS, a WLAN, NFC, FM, an IR technology, and/or the like. The GNSS may include a global positioning system (GPS for show below), a global navigation satellite system (GLONASS for show below), a BeiDou navigation satellite system (BDS for show below), a quasi-zenith satellite system (QZSS for show below), and/or a satellite based augmentation system (SBAS for show below).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, and execute program instructions to generate or change display information.

The display 194 is configured to display an image, a video, or the like. The display 194 includes a display panel. The display panel may be a liquid crystal display (LCD for show below), an organic light-emitting diode (OLED for show below), an active-matrix organic light-emitting diode (AMOLED for show below), a flexible light-emitting diode (FLED for show below), a mini LED, a micro LED, a micro OLED, a quantum dot light-emitting diode (QLED for show below), or the like. In some embodiments, the electronic device 100 may include one or N displays 194, where N is a positive integer greater than 1.

The electronic device 100 can implement a photographing function through the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD for show below) or a complementary metal-oxide-semiconductor (CMOS for show below) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to: compress or decompress a digital video. The electronic device 100 may support one or more types of video codecs. In this way, the electronic device 100 can play or record videos in a plurality of encoding formats, for example, moving picture experts group (MPEG for show below)-1, MPEG-2, MPEG-3, and MPEG-4.

The NPU is a neural-network (NN for show below) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash storage device, or a universal flash storage (UFS for show below). The processor 110 runs instructions stored in the internal memory 121 and/or instructions stored in the memory disposed in the processor, to perform various function applications of the electronic device 100 and data processing.

The electronic device 100 may implement audio functions by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal for output, and is also configured to convert an analog audio input into a digital audio signal. The audio module 170 may be further configured to code and decode audio signals. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to enter a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5-mm open mobile terminal platform (OMTP for show below) standard interface, or a cellular telecommunications industry association of the USA (CTIA for show below) standard interface.

The pressure sensor 180A is configured to sense a pressure signal, and can convert the pressure signal into an electrical signal. In some embodiments, the pressure sensor 180A may be disposed on the display 194.

There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed on a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during shooting. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in navigation and motion sensing game scenarios.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a flip cover mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application access locking, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch-sensitive button. The electronic device 100 may receive a key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (such as a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 may also be compatible with different types of SIM cards. The SIM card interface 195 is also compatible to an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

An embodiment of this application further provides a computer-readable storage medium. The computer-readable storage medium stores computer programs. When the computer programs are run on a computer, the computer is enabled to perform the methods provided in the embodiments shown in FIG. 3 to FIG. 6 in this application.

An embodiment of this application further provides a computer-readable storage medium. The computer-readable storage medium stores computer programs. When the computer programs are run on a computer, the computer is enabled to perform the method provided in the embodiment shown in FIG. 7 in this application.

An embodiment of this application further provides a computer program product. The computer program product includes computer programs. When the computer programs are run on a computer, the computer is enabled to perform the methods provided in the embodiments shown in FIG. 3 to FIG. 6 in this application.

An embodiment of this application further provides a computer program product. The computer program product includes computer programs. When the computer programs are run on a computer, the computer is enabled to perform the method provided in the embodiment shown in to FIG. 7 in this application.

In embodiments of this application, "at least one" means one or more, and "a plurality of" means two or more. The term "and/or" describes an association relationship for describing associated objects and indicates that three relationships may exist. For example, A and/or B may indicate the following three cases: Only A exists, both A and B exist, and only B exists. A and B may be in a singular form or a plural form. The character "/" generally indicates an "or" relationship between the associated objects. At least one of the following items and similar expressions refer to any combination of the items, including a single item or any combination of plural items. For example, at least one of a, b, and c may indicate a, b, c, a and b, a and c, b and c, or a, b, and c, where a, b, and c may be singular or plural.

A person of ordinary skill in the art may be aware that, with reference to the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments of this application, when any of the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the operations of the method described in embodiments of this application. The foregoing storage medium includes: any medium that can store program code, such as a USB flash drive, a removable hard disk, a read-only memory (ROM), a random access memory (Random Access Memory, RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method for pushing vehicle information, comprising:
   receiving a vehicle entry event sent by a parking management server, wherein the vehicle entry event is sent by the parking management server after the parking management server receives a notification message indicating that a vehicle enters a parking lot, and the vehicle entry event comprises a license plate number of the vehicle;
   obtaining geo-fence information of the parking lot managed by the parking management server, and a user account bound to the license plate number of the vehicle;
   obtaining a location determination result of user equipment corresponding to the user account, wherein the location determination result comprises a determination result about whether a current location of the user equipment is within a geo-fence range indicated by the geo-fence information;
   pushing the vehicle entry event to the user equipment when the current location of the user equipment is within the geo-fence range;
   receiving a vehicle exit event sent by the parking management server, wherein the vehicle exit event is sent by the parking management server after the parking management server receives a notification message indicating that the vehicle moves out of the parking lot, and the vehicle exit event comprises the license plate number of the vehicle;
   obtaining user accounts bound to the license plate number;
   searching the user accounts bound to the license plate number for a target user account to which the license plate number has been pushed in a latest vehicle entry event; and
   when the target user account is found, pushing the vehicle exit event and fee deduction information of the vehicle to user equipment corresponding to the target user account.

2. The method according to claim 1, wherein the obtaining of the location determination result of the user equipment corresponding to the user account comprises:
   sending the geo-fence information of the parking lot to the user equipment corresponding to the user account, and notifying the user equipment to report the location determination result of the user equipment; and
   receiving the location determination result that is of the user equipment and that is sent by the user equipment, wherein the location determination result is sent by the user equipment after the user equipment positions the current location of the user equipment and determines whether the current location of the user equipment is within the geo-fence range indicated by the geo-fence information.

3. The method according to claim 1, wherein the obtaining the location determination result of user equipment corresponding to the user account comprises:
   notifying the user equipment corresponding to the user account to report the current location of the user equipment;
   receiving the current location that is of the user equipment and that is sent by the user equipment; and
   determining whether the current location of the user equipment is within the geo-fence range indicated by the geo-fence information.

4. The method according to claim 1, wherein after the searching the user accounts bound to the license plate number for the target user account to which the license plate number has been pushed in the latest vehicle entry event, the method further comprises:
   when the target user account is not found, searching the user accounts bound to the license plate number for a user account supporting fee deduction; and
   sending fee deduction information of the vehicle to the user account supporting the fee deduction.

5. An apparatus for pushing vehicle information, comprising:
   a processor, and
   a memory coupled to the processor to store instructions, which when executed by the processor, cause the processor to perform operations, the operations comprising:
   receiving a vehicle entry event sent by a parking management server, wherein the vehicle entry event is sent by the parking management server after the parking management server receives a notification message indicating that a vehicle enters a parking lot, and the vehicle entry event comprises a license plate number of the vehicle;

obtaining geo-fence information of the parking lot managed by the parking management server; obtain a user account bound to the license plate number of the vehicle; and obtain a location determination result of user equipment corresponding to the user account, wherein the location determination result comprises a determination result about whether a current location of the user equipment is within a geo-fence range indicated by the geo-fence information;

pushing the vehicle entry event to the user equipment when the current location of the user equipment is within the geo-fence range;

receiving a vehicle exit event sent by the parking management server, wherein the vehicle exit event is sent by the parking management server after the parking management server receives a notification message indicating that the vehicle moves out of the parking lot, and the vehicle exit event comprises the license plate number of the vehicle;

obtaining user accounts bound to the license plate number;

searching the user accounts that are bound to the license plate number for a target user account to which the license plate number has been pushed in a latest vehicle entry event; and when the target user account is found, pushing the vehicle exit event and fee deduction information of the vehicle to user equipment corresponding to the target user account.

6. The apparatus according to claim 5, wherein the operations further comprise:

sending the geo-fence information of the parking lot to the user equipment corresponding to the user account, and notify the user equipment to report the location determination result of the user equipment; and receiving the location determination result that is of the user equipment and that is sent by the user equipment, wherein the location determination result is sent by the user equipment after the user equipment positions the current location of the user equipment and determines whether the current location of the user equipment is within the geo-fence range indicated by the geo-fence information.

7. The apparatus according to claim 5, wherein the operations further comprise:

notifying the user equipment corresponding to the user account to report the current location of the user equipment;

receiving the current location that is of the user equipment and that is sent by the user equipment; and determining whether the current location of the user equipment is within the geo-fence range indicated by the geo-fence information.

8. The apparatus according to claim 5, wherein the operations further comprise:

after the searching the user accounts bound to the license plate number for the target user account to which the license plate number has been pushed in the latest vehicle entry event, and when the target user account is not found, searching the user accounts bound to the license plate number for a user account supporting fee deduction; and sending fee deduction information of the vehicle to the user account supporting the fee deduction.

9. A user account server, comprising:

one or more processors;

a memory coupled to the one or more processors and storing instructions, which, when executed by the one or more processors, cause the user account server to perform operations comprising:

receiving a vehicle entry event sent by a parking management server, wherein the vehicle entry event is sent by the parking management server after the parking management server receives a notification message indicating that a vehicle enters a parking lot, and the vehicle entry event comprises a license plate number of the vehicle;

obtaining geo-fence information of the parking lot managed by the parking management server, and a user account bound to the license plate number of the vehicle;

obtaining a location determination result of user equipment corresponding to the user account, wherein the location determining result comprises a determining result about whether a current location of the user equipment is within a geo-fence range indicated by the geo-fence information;

pushing the vehicle entry event to the user equipment when the current location of the user equipment is within the geo-fence range;

receiving a vehicle exit event sent by the parking management server, wherein the vehicle exit event is sent by the parking management server after the parking management server receives a notification message indicating that the vehicle moves out of the parking lot, and the vehicle exit event comprises the license plate number of the vehicle;

obtaining user accounts bound to the license plate number;

searching the user accounts bound to the license plate number for a target user account to which the license plate number has been pushed in a latest vehicle entry event; and when the target user account is found, pushing the vehicle exit event and fee deduction information of the vehicle to user equipment corresponding to the target user account.

10. The user account server according to claim 9, wherein the operations further comprise:

sending the geo-fence information of the parking lot to the user equipment corresponding to the user account, and notifying the user equipment to report the location determination result of the user equipment; and receiving the location determination result that is of the user equipment and that is sent by the user equipment, wherein the location determination result is sent by the user equipment after the user equipment positions the current location of the user equipment and determines whether the current location of the user equipment is within the geo-fence range indicated by the geo-fence information.

11. The user account server according to claim 9, wherein the operations further comprise:

notifying the user equipment corresponding to the user account to report the current location of the user equipment;

receiving the current location that is of the user equipment and that is sent by the user equipment; and determining whether the current location of the user equipment is within the geo-fence range indicated by the geo-fence information.

12. The user account server according to claim 9, wherein the operations further comprise:
after the user account server searches the user accounts bound to the license plate number for the target user account to which the license plate number has been pushed in the latest vehicle entry event, and if the target user account is not found, searching the user accounts bound to the license plate number for a user account supporting fee deduction; and
sending fee deduction information of the vehicle to the user account supporting the fee deduction.

\* \* \* \* \*